(12) United States Patent
Akiyama et al.

(10) Patent No.: US 7,733,440 B2
(45) Date of Patent: Jun. 8, 2010

(54) LIQUID CRYSTAL DISPLAY DEVICE

(75) Inventors: Takashi Akiyama, Sayama (JP); Sachiko Kawada, Kodaira (JP); Tsutomu Ohara, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 168 days.

(21) Appl. No.: 11/806,440

(22) Filed: May 31, 2007

(65) Prior Publication Data

US 2008/0007674 A1 Jan. 10, 2008

(30) Foreign Application Priority Data

| Jun. 2, 2006 | (JP) | ............................ 2006-154535 |
| Jun. 2, 2006 | (JP) | ............................ 2006-154783 |

(51) Int. Cl.
*G02F 1/1335* (2006.01)
*G02F 1/1339* (2006.01)

(52) U.S. Cl. ........................... 349/64; 349/65; 349/153; 349/154

(58) Field of Classification Search ................... 349/62, 349/64–66, 153, 154
See application file for complete search history.

(56) References Cited

U.S. PATENT DOCUMENTS

2004/0100597 A1 * 5/2004 Fukuda et al. .............. 349/112

FOREIGN PATENT DOCUMENTS

| JP | 11183888 A | * | 7/1999 |
| JP | H11-183888 A | | 7/1999 |
| JP | 2000-162672 A | | 6/2000 |

* cited by examiner

*Primary Examiner*—Michelle R Connelly Cushwa
(74) *Attorney, Agent, or Firm*—Finnegan, Henderson, Farabow, Garrett & Dunner, L.L.P.

(57) ABSTRACT

An object of the present invention is to provide a liquid crystal display apparatus that can eliminate brightness nonuniformity by suitably diffusing light emitted from a light source. The liquid crystal display apparatus includes a liquid crystal panel providing a liquid crystal between a pair of substrates, the liquid crystal panel having an effective display area for displaying information, a sealing member placed around the liquid crystal in order to seal the liquid crystal between the pair of substrates, a light source for illuminating the liquid crystal panel from an edge thereof, and light diffusing means, provided between the pair of substrates, for diffusing the light introduced from the light source into the effective display area.

14 Claims, 23 Drawing Sheets

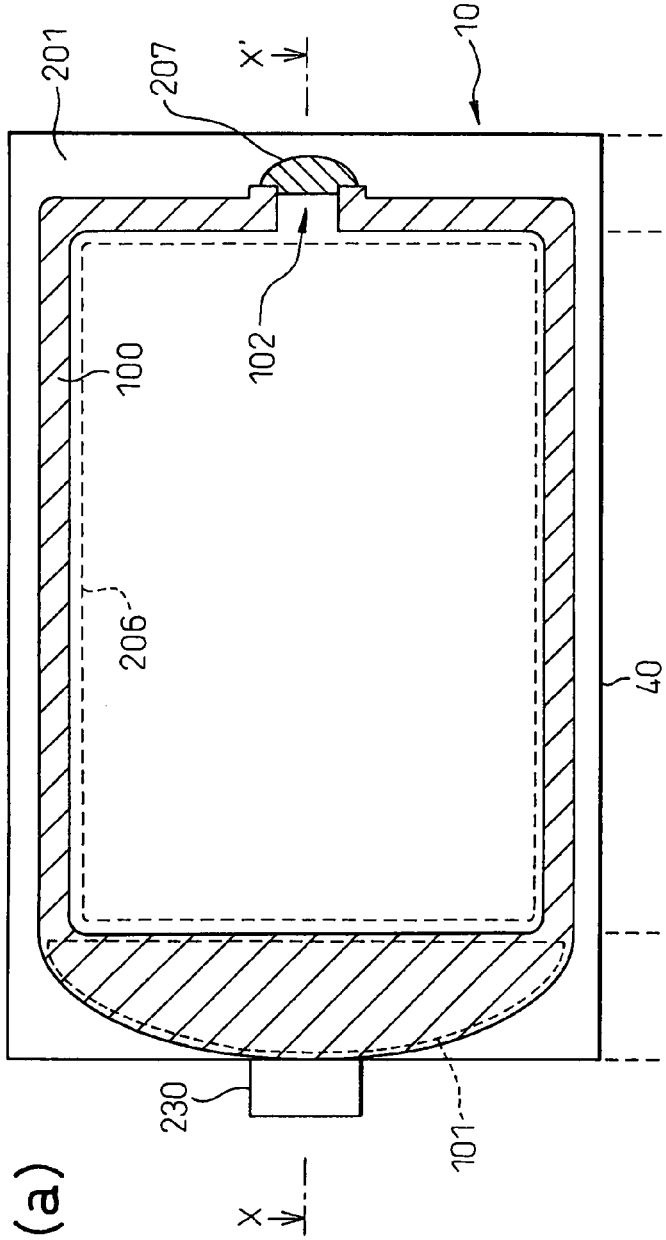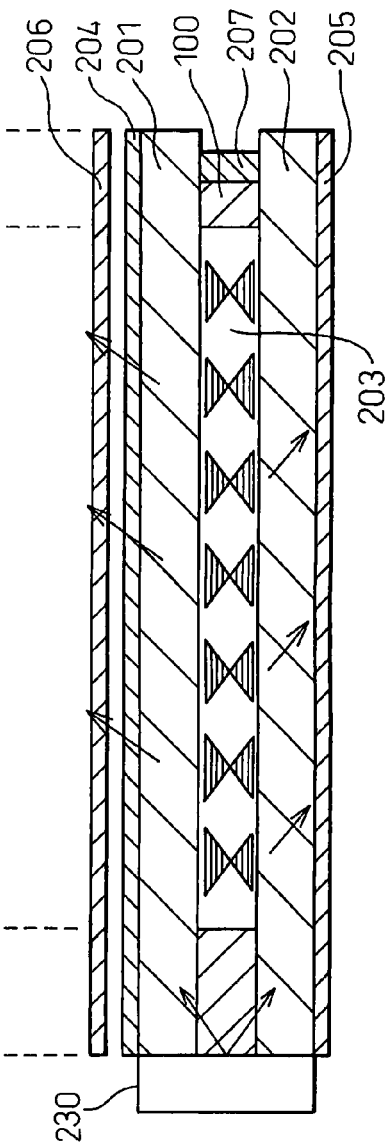
Fig.2(a)
Fig.2(b)

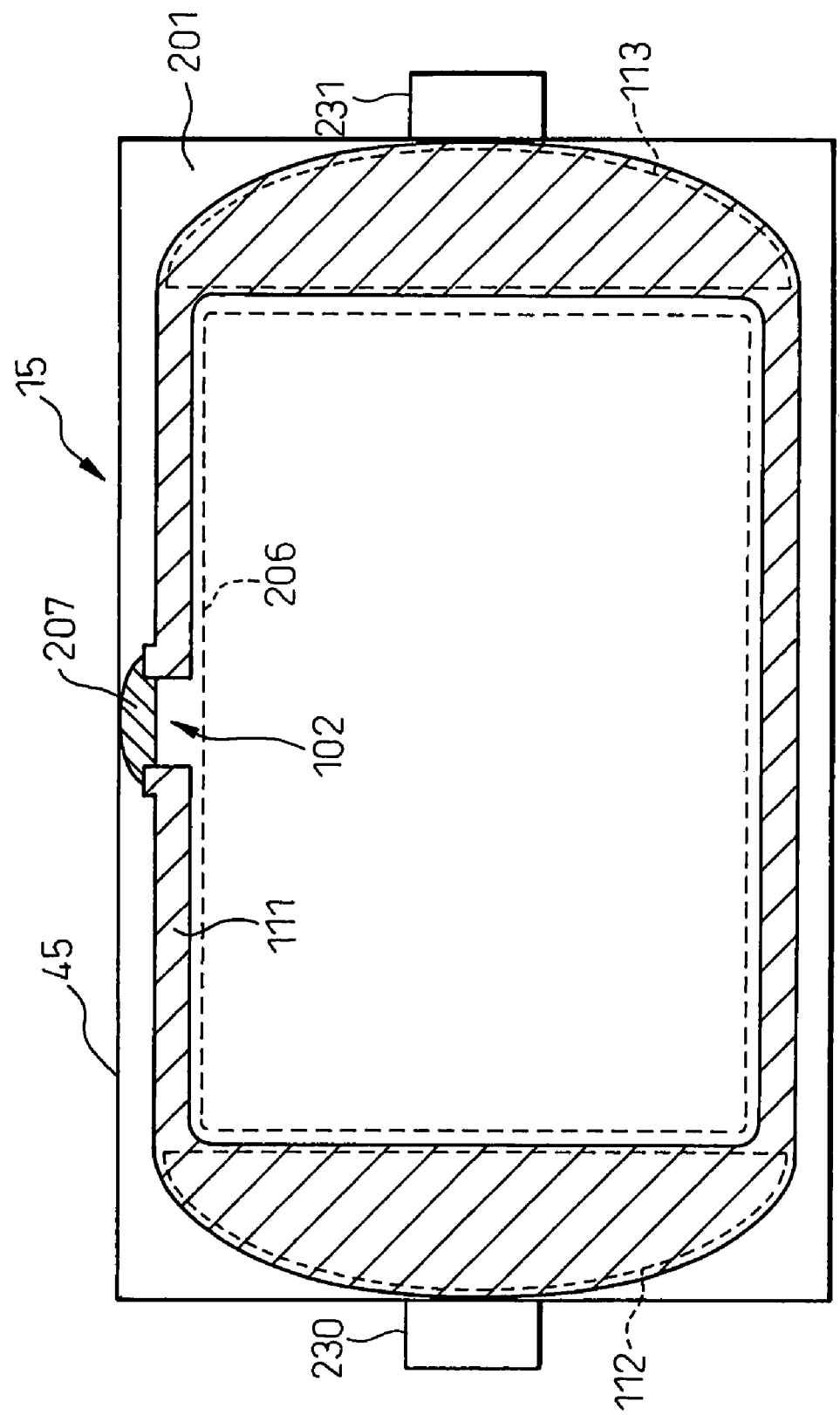

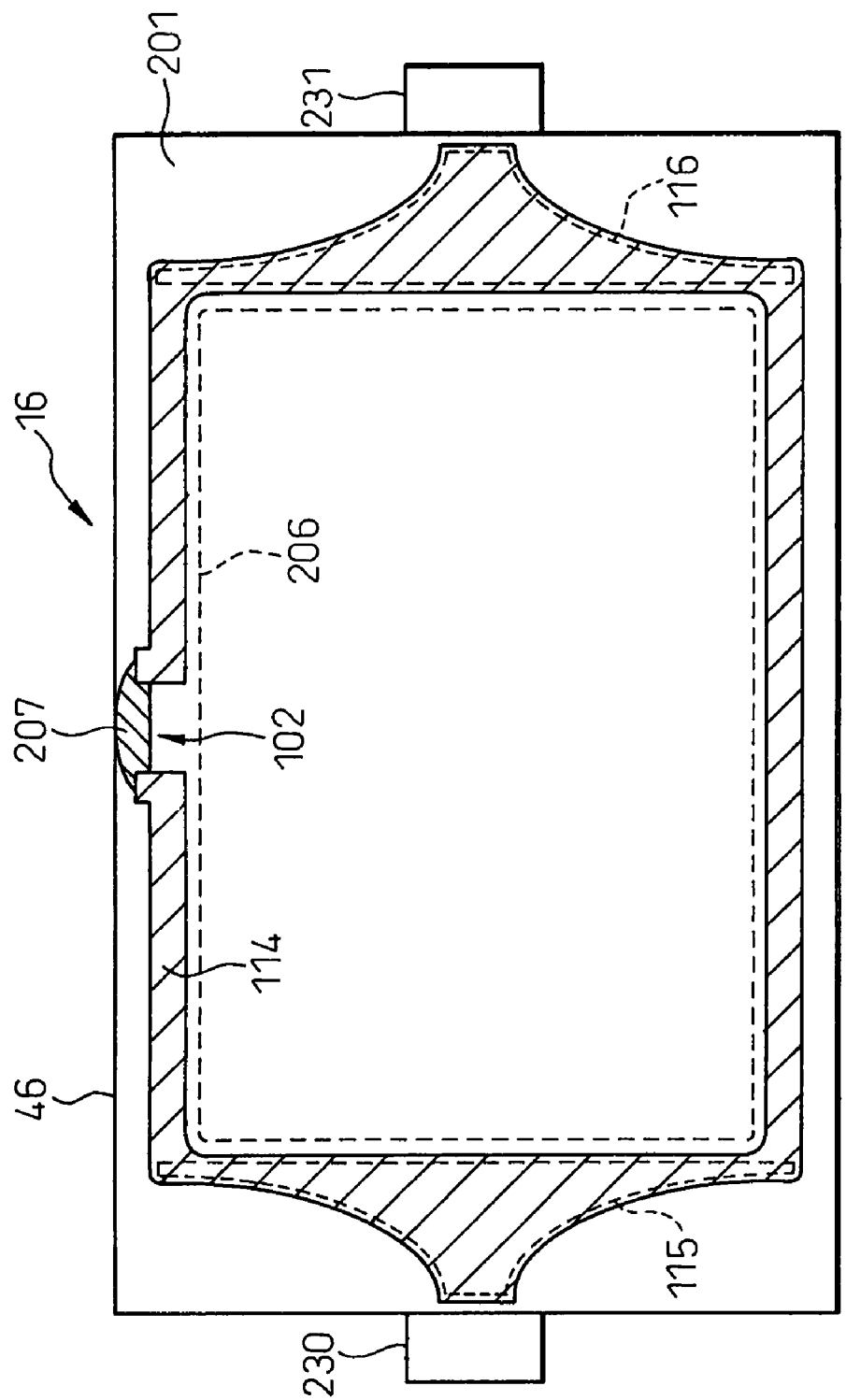

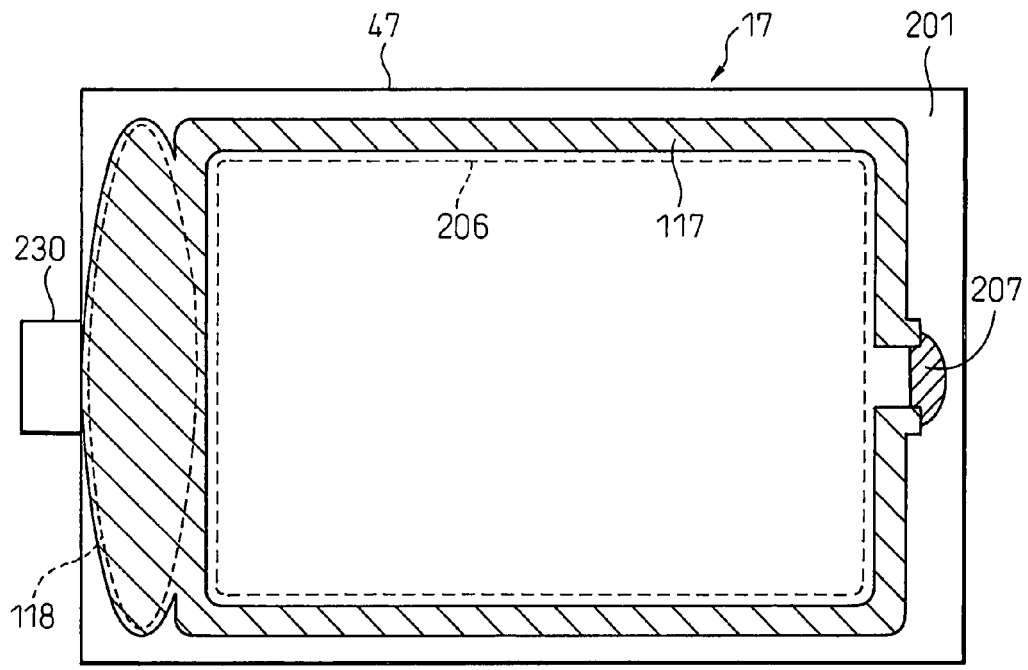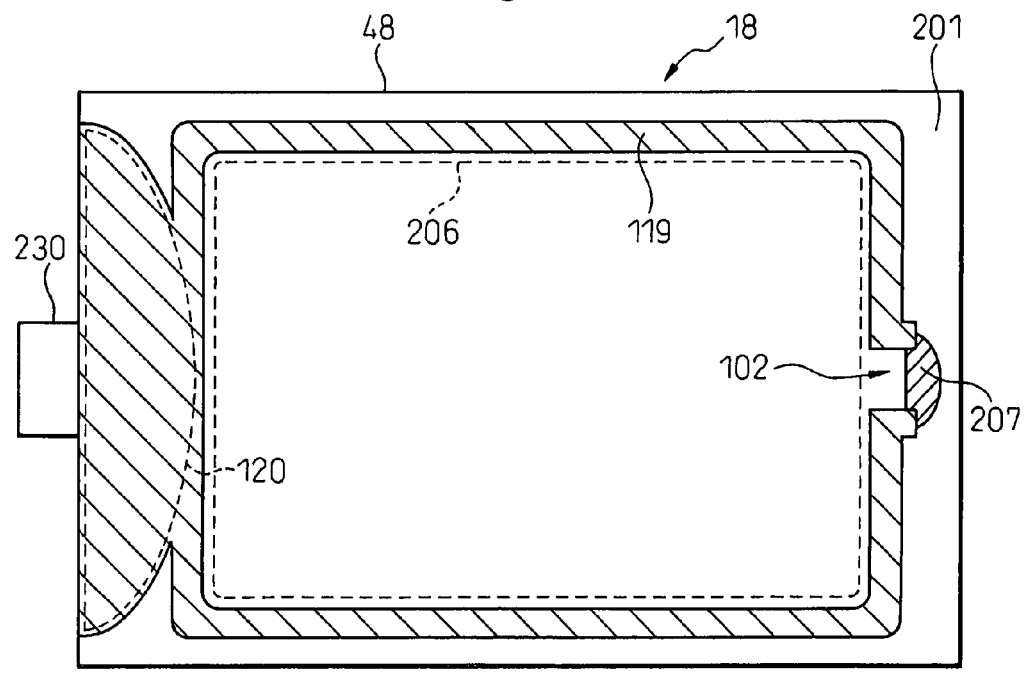

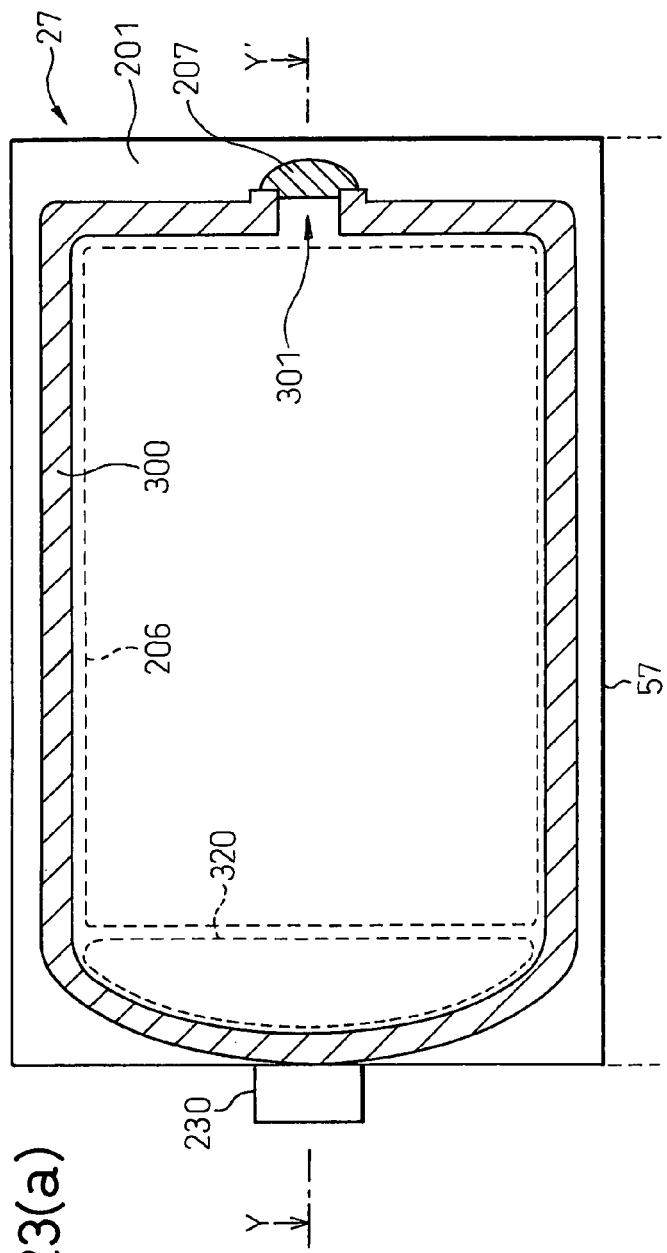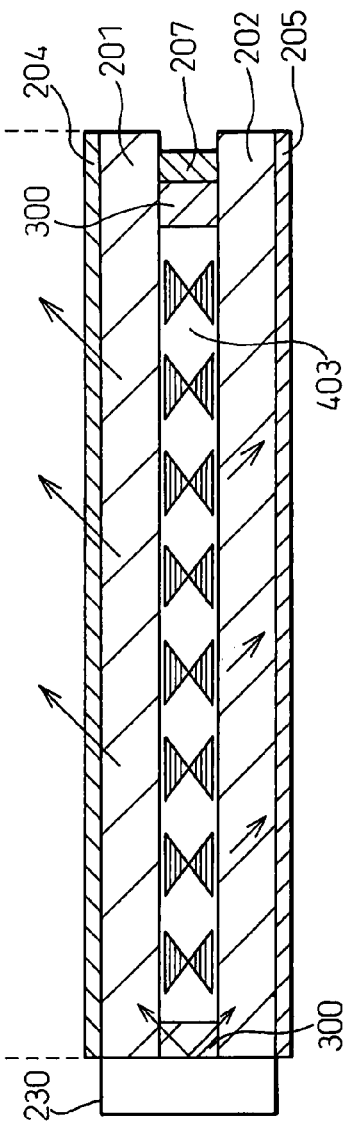
Fig.23(a)
Fig.23(b)

LIQUID CRYSTAL DISPLAY DEVICE

This application is a new U.S. patent application that claims benefit of Japanese Patent Applications No. 2006-154535, file on Jun. 2, 2006, and No. 2006-154783, filed on Jun. 2, 2006, the entire content of the Japanese Patent Applications No. 2006-154535 and No. 2006-154783 is hereby incorporated by reference.

FIELD OF THE INVENTION

The present invention relates to a liquid crystal display apparatus, and more particularly to a liquid crystal display apparatus having an effective display area free from brightness nonuniformity.

BACKGROUND OF THE INVENTION

FIG. 1 is a diagram showing one example of a prior art liquid crystal display apparatus 1.

The liquid crystal display apparatus 1 shown in FIG. 1 comprises a liquid crystal panel 2 and a point light source 9. The liquid crystal panel 2 is constructed by sandwiching a liquid crystal between substrates using a sealing member 3 and a seal 4. Light radiated from the point light source 9 diffuses into the liquid crystal panel 2 as shown by arrows 5. However, in regions 6 and 8 in the figure, the light is not sufficiently diffused, and brightness is reduced. On the other hand, in region 7 in the figure, a bright spot may be produced due to increased brightness due to the region being close to the light source. In this way, the prior art liquid crystal display apparatus 1 has had a problem in that the brightness is not uniform over the entire display area.

In view of this, an attempt has been made to solve the problem of brightness nonuniformity by mixing light scattering particles into the sealing member on the light source side and thereby causing the light to be scattered (for example, refer to patent document 1). When such light scattering particles are mixed into the sealing member on the light source side, the light is scattered when passing through the sealing member on the light source side. While this serves to prevent the brightness from being reduced in the regions 6 and 8 in FIG. 1, the light is not spread throughout the liquid crystal panel, and the brightness is reduced in regions far from the light source. On the other hand, if a sufficient number of light scattering particles are not mixed into the sealing member on the light source side, the light is not sufficiently scattered, resulting in an inability to prevent reduced brightness in the regions 6 and 8 in FIG. 1.

Another attempt has been made to solve the problem of brightness nonuniformity by providing prescribed spacing between the light source and the liquid crystal and by forming a frosted glass-like rough surface on a glass substrate between them, thereby diffusing the light through the rough surface (for example, refer to patent document 2). This, however, has involved a problem in that not only is it difficult to roughen only the designated portion of the substrate, but cost also increases.

A further attempt has been made to solve the problem of brightness nonuniformity by providing prescribed spacing between the liquid crystal and the effective display area and by providing therebetween a polymer-dispersed liquid crystal or a scattering segment formed from a polymer-dispersed liquid crystal, thereby causing the light to be scattered through the liquid crystal itself or through the scattering segment (for example, refer to patent document 2). This, however, has involved a problem in that it requires the use of an expensive polymer-dispersed liquid crystal material, and to form the scattering segment from the polymer-dispersed liquid crystal, the liquid crystal has to be sealed separately. It also has been difficult to effectively utilize the light by simply providing the polymer-dispersed liquid crystal between the liquid crystal and the effective display area.

Patent document 1: Japanese Unexamined Patent Publication No. H11-183888 (FIG. 1)

Patent document 2: Japanese Unexamined Patent Publication No. 2000-162672 (FIGS. 4, 5, and 6)

SUMMARY OF THE INVENTION

Accordingly, it is an object of the present invention to provide a liquid crystal display apparatus that can solve the problem of brightness nonuniformity.

More specifically, it is an object of the present invention to provide a liquid crystal display apparatus that can solve the problem of brightness nonuniformity by forming an adjusting area in the sealing member on the light source side and by suitably causing the light introduced from the light source to diffuse through the adjusting area.

It is also an object of the present invention to provide a liquid crystal display apparatus that can solve the problem of brightness nonuniformity by forming a seal pattern between the light source and the sealing member and by suitably causing the light introduced from the light source to diffuse through the seal pattern.

It is a further object of the present invention to provide a liquid crystal display apparatus that can solve the problem of brightness nonuniformity by suitably causing the light introduced from the light source to diffuse through a light diffusing area formed from a polymer-dispersed liquid crystal.

A liquid crystal display apparatus according to the present invention includes a liquid crystal panel providing a liquid crystal between a pair of substrates, the liquid crystal panel having an effective display area for displaying information, a sealing member placed around the liquid crystal in order to seal the liquid crystal between the pair of substrates, a light source for illuminating the liquid crystal panel from an edge thereof, and light diffusing means, provided between the pair of substrates, for diffusing the light introduced from the light source into the effective display area.

Preferably, in the liquid crystal display apparatus according to the present invention, the light diffusing means is formed as part of the sealing member.

Preferably, in the liquid crystal display apparatus according to the present invention, the part of the sealing member that functions as the light diffusing means has a shape that is determined based on a light emission characteristic of the light source.

Preferably, in the liquid crystal display apparatus according to the present invention, the part of the sealing member that functions as the light diffusing means is formed in a rectangular shape, or a semicylindrical shape whose side facing the light source forms an apex and whose side facing the effective display area forms a base side, or a substantially trapezoidal shape whose side facing the light source forms a top side and whose side facing the effective display area forms a bottom side, or a semicylindrical shape whose side facing the light source forms a base side and whose side facing the effective display area forms an apex, or a substantially trapezoidal shape whose side facing the light source forms a bottom side and whose side facing the effective display area forms a top side, or a substantially oval shape.

Preferably, in the liquid crystal display apparatus according to the present invention, the light source includes a plurality of LEDs, and the part of the sealing member that functions as the light diffusing means is formed, for each of the LEDs, in a rectangular shape, or a semicylindrical shape whose side facing the light source forms an apex and whose side facing the effective display area forms a base side, or a substantially trapezoidal shape whose side facing the light source forms a top side and whose side facing the effective display area forms a bottom side, or a semicylindrical shape whose side facing the light source forms a base side and whose side facing the effective display area forms an apex, or a substantially trapezoidal shape whose side facing the light source forms a bottom side and whose side facing the effective display area forms a top side, or a substantially oval shape.

Preferably, in the liquid crystal display apparatus according to the present invention, the light diffusing means is a seal pattern, provided between the light source and the sealing member, for diffusing the light introduced from the light source through the sealing member into the effective display area.

Preferably, in the liquid crystal display apparatus according to the present invention, the seal pattern comprises a plurality of bar-like patterns, or a plurality of dot patterns, or a plurality of arch-like patterns, or a plurality of bent patterns.

Preferably, in the liquid crystal display apparatus according to the present invention, the seal pattern is formed from the same material as the sealing member.

Preferably, in the liquid crystal display apparatus according to the present invention, the liquid crystal is a polymer-dispersed liquid crystal, the sealing member seals the liquid crystal so that the effective display area and a light diffusing area continuous with the effective display area can be formed, and the light diffusing means is formed from the polymer-dispersed liquid crystal sealed within the light diffusing area.

Preferably, in the liquid crystal display apparatus according to the present invention, the light diffusing area is formed in a semicylindrical shape whose side facing the light source forms an apex and whose side facing the effective display area forms a base side, or a substantially trapezoidal shape whose side facing the light source forms a top side and whose side facing the effective display area forms a bottom side, or a substantially oval shape, or a substantially rectangular shape.

Preferably, in the liquid crystal display apparatus according to the present invention, the light source includes a plurality of LEDs, and the light diffusing area is formed, for each of the LEDs, in a semicylindrical shape whose side facing the light source forms an apex and whose side facing the effective display area forms a base side, or a substantially trapezoidal shape whose side facing the light source forms a top side and whose side facing the effective display area forms a bottom side, or a substantially oval shape, or a substantially rectangular shape.

Preferably, in the liquid crystal display apparatus according to the present invention, the plurality of LEDs are arranged at corresponding positions on one side of the effective display area.

Preferably, in the liquid crystal display apparatus according to the present invention, the plurality of LEDs are arranged at respectively corresponding positions on a plurality of sides of the effective display area.

A liquid crystal display apparatus according to the present invention includes a liquid crystal panel providing a liquid crystal between a pair of substrates, the liquid crystal panel having an effective display area for displaying information, a light source for illuminating the liquid crystal panel from an edge thereof, and a sealing member placed around the liquid crystal in order to seal the liquid crystal between the pair of substrates, and having an adjusting area located within the liquid crystal panel in a portion facing the light source and a peripheral area located within the liquid crystal panel in a portion other than the portion facing the light source, wherein the adjusting area for causing light introduced from the light source to diffuse into the effective display area is determined based on a light emission characteristic of the light source.

A liquid crystal display apparatus according to the present invention includes a liquid crystal panel providing a liquid crystal between a pair of substrates, the liquid crystal panel having an effective display area for displaying information, a light source for illuminating the liquid crystal panel from an edge thereof, a sealing member placed around the liquid crystal in order to seal the liquid crystal between the pair of substrates, and a seal pattern, provided in a space created between the light source and the sealing member and sandwiched between the pair of substrates, for causing light introduced from the light source to diffuse into the effective display area.

A liquid crystal display apparatus according to the present invention includes a liquid crystal panel providing a polymer-dispersed liquid crystal between a pair of substrates, the liquid crystal panel having an effective display area for displaying information and a light diffusing area formed continuously with the effective display area, a sealing member placed around the polymer-dispersed liquid crystal in order to seal the polymer-dispersed liquid crystal between the pair of substrates so that the effective display area and the light diffusing area can be formed, and a light source for illuminating the liquid crystal panel from an edge thereof through the polymer-dispersed liquid crystal sealed within the light diffusing area, wherein the light diffusing area has a shape that is determined based on a light emission characteristic of the light source.

A liquid crystal display apparatus according to the present invention includes a liquid crystal panel providing a polymer-dispersed liquid crystal between a pair of substrates, the liquid crystal panel having an effective display area for displaying information and a light diffusing area formed continuously with the effective display area, a sealing member placed around the polymer-dispersed liquid crystal in order to seal the polymer-dispersed liquid crystal between the pair of substrates so that the effective display area and the light diffusing area can be formed, and a light source for illuminating the liquid crystal panel from an edge thereof through the polymer-dispersed liquid crystal sealed within the light diffusing area, wherein the light diffusing area is formed in a semicylindrical shape whose side facing the light source forms an apex and whose side facing the effective display area forms a base side.

A liquid crystal display apparatus according to the present invention includes a liquid crystal panel providing a polymer-dispersed liquid crystal between a pair of substrates, the liquid crystal panel having an effective display area for displaying information and a light diffusing area formed continuously with the effective display area, a sealing member placed around the polymer-dispersed liquid crystal in order to seal the polymer-dispersed liquid crystal between the pair of substrates so that the effective display area and the light diffusing area can be formed; and a light source for illuminating the liquid crystal panel from an edge thereof through the polymer-dispersed liquid crystal sealed within the light diffusing area, wherein the light diffusing area is formed in a substantially trapezoidal shape whose side facing the light source forms a top side and whose side facing the effective display area forms a bottom side.

A liquid crystal display apparatus according to the present invention includes a liquid crystal panel providing a polymer-dispersed liquid crystal between a pair of substrates, the liquid crystal panel having an effective display area for displaying information and a light diffusing area formed continuously with the effective display area, a sealing member placed around the polymer-dispersed liquid crystal in order to seal the polymer-dispersed liquid crystal between the pair of substrates so that the effective display area and the light diffusing area can be formed; and a light source for illuminating the liquid crystal panel from an edge thereof through the polymer-dispersed liquid crystal sealed within the light diffusing area, wherein the light diffusing area is formed in a substantially oval shape.

A liquid crystal display apparatus according to the present invention includes a liquid crystal panel constructed by sandwiching a polymer-dispersed liquid crystal between a pair of substrates, the liquid crystal panel having an effective display area for displaying information and a light diffusing area formed continuously with the effective display area, a sealing member placed around the polymer-dispersed liquid crystal in order to seal the polymer-dispersed liquid crystal between the pair of substrates so that the effective display area and the light diffusing area can be formed, and a light source for illuminating the liquid crystal panel from an edge thereof through the polymer-dispersed liquid crystal sealed within the light diffusing area, wherein the light diffusing area is formed in a substantially rectangular shape.

In the liquid crystal display apparatus according to the present invention, since the adjusting area is formed using the sealing member on the light source side, and the light introduced from the light source is suitably caused to diffuse through the adjusting area, it is therefore possible to eliminate brightness nonuniformity in an inexpensive way.

Further, in the liquid crystal display apparatus according to the present invention, since the shape of the sealing member can be changed to match the emission intensity and other characteristics of the light source, it is therefore possible to eliminate brightness nonuniformity in a reliable manner.

Further, in the liquid crystal display apparatus according to the present invention, since a seal pattern is formed between the light source and the sealing member, and the light introduced from the light source is suitably caused to diffuse through the seal pattern, it is therefore possible to eliminate brightness nonuniformity in an inexpensive way.

Further, in the liquid crystal display apparatus according to the present invention, since the shape of the seal pattern can be changed to match the emission intensity and other characteristics of the light source, it is therefore possible to eliminate brightness nonuniformity in a reliable manner.

Further, in the liquid crystal display apparatus according to the present invention, since the light introduced from the light source is suitably caused to diffuse through the light diffusing area of a polymer-dispersed liquid crystal formed in a prescribed shape, it is therefore possible to eliminate brightness nonuniformity in an inexpensive way.

Further, in the liquid crystal display apparatus according to the present invention, since the shape of the light diffusing area can be changed to match the emission intensity and other characteristics of the light source, it is therefore possible to eliminate brightness nonuniformity in a reliable manner.

BRIEF DESCRIPTION OF THE DRAWINGS

These and other features and advantages of the present invention will be better understood by reading the following detailed description, taken together with the drawings wherein:

FIG. 2(a) is a diagram schematically showing the structure of a liquid crystal display apparatus 10 according to the present invention, and FIG. 2(b) is a cross-sectional view taken along line X-X' in FIG. 2(a);

FIG. 8 is a diagram schematically showing the structure of another liquid crystal display apparatus 15 according to the present invention;

FIG. 9 is a diagram schematically showing the structure of another liquid crystal display apparatus 16 according to the present invention;

FIG. 10 is a diagram schematically showing the structure of another liquid crystal display apparatus 17 according to the present invention;

FIG. 11 is a diagram schematically showing the structure of another liquid crystal display apparatus 18 according to the present invention;

FIG. 23(a) is a diagram schematically showing the structure of a liquid crystal display apparatus 27 according to the present invention, and FIG. 23(b) is a cross-sectional view taken along line Y-Y' in FIG. 23(a);

DETAILED DESCRIPTION OF THE PREFERRED EMBODIMENT

Figure 1:
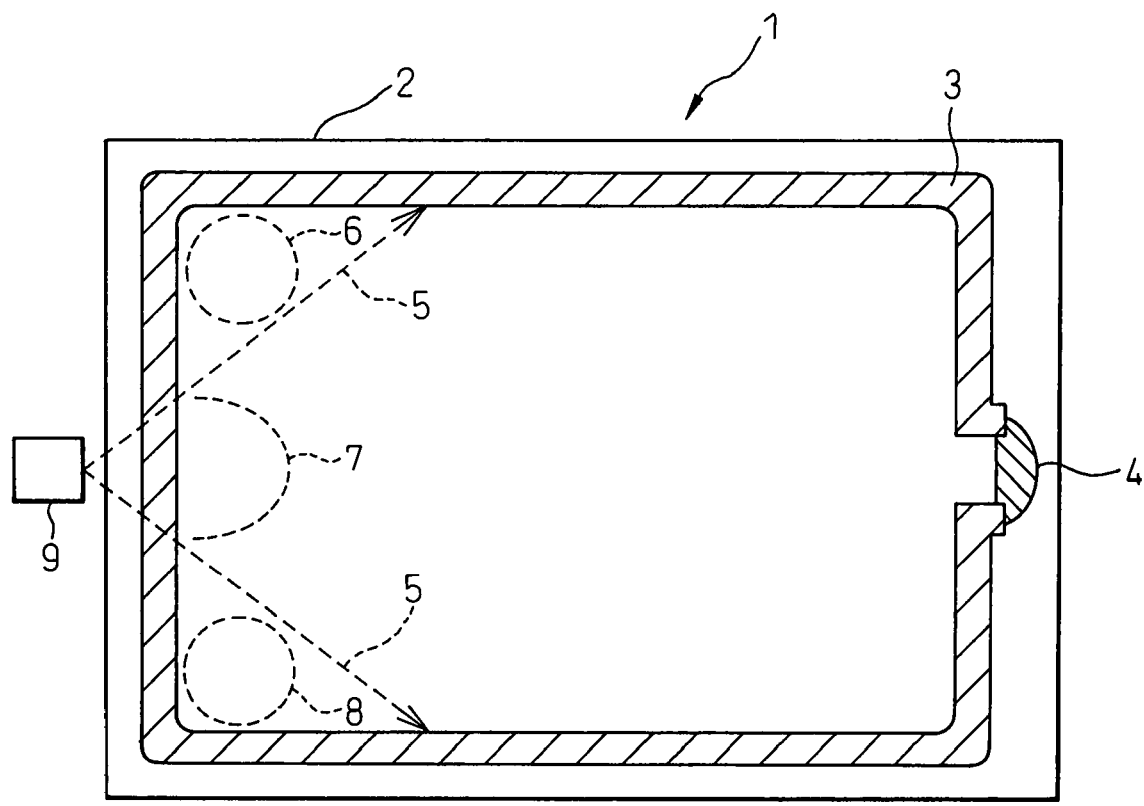
FIG. 1 is a diagram schematically showing the structure of a prior art liquid crystal display apparatus.

A liquid crystal display apparatus according to the present invention will be described below with reference to the drawings. It will, however, be understood that the liquid crystal display apparatus according to the present invention is in no way limited by the description given herein, but can be embodied in a variety of forms as long as the embodiment does not deviate from the technical scope of the present invention.

FIG. 2 is a diagram schematically showing the structure of a liquid crystal display apparatus 10 according to the present invention.

FIG. 2(a) is a front view schematically showing the structure of the liquid crystal display apparatus 10, and FIG. 2(b) is a cross-sectional view taken along line X-X' in FIG. 2(a). As shown in FIG. 2, the liquid crystal display apparatus 10 comprises a liquid crystal panel 40 and a W (white) LED 230 as a point light source mounted on one side of the liquid crystal panel 40.

The liquid crystal panel 40 is constructed by bonding together a pair of glass substrates 201 and 202 with a sealing member 100 and by injecting a liquid crystal 203 through an opening of the sealing member so as to be sandwiched between the pair of glass substrates and sealing the opening with a sealant 207. A prism sheet 204 and a polarizer 206 bonded on top of the prism sheet 204 with an air layer interposed therebetween are arranged on the viewer side (the upper side in FIG. 2(b)) of the liquid crystal panel 40. A reflective polarizer 205 is mounted on the opposite side of the liquid crystal panel 40. The liquid crystal panel 40 is a TFT active-matrix liquid crystal display which can produce a 2.4-inch, QVGA-size (350×240 pixels) display. A plurality of signal electrodes and a plurality of scanning electrodes are respectively formed by patterning on the inside surfaces of the two glass substrates 201 and 202 of the liquid crystal panel 40; every point where a signal electrode and a scanning electrode intersect corresponds to a display pixel.

A TN liquid crystal is used as the liquid crystal 203. However, other liquid crystal modes may be used, examples including polymer-dispersed liquid crystals such as PNLCs and PDLCs, OCB (Optical Compensated Birefringence) mode using nematic liquid crystals, IPS (In-Plane Switching) mode, PVA (Patterned Vertical Alignment) mode, SSFLC (Surface Stabilized Ferroelectric Crystal) mode using smectic liquid crystals, AFLC (Anti-FLC) mode, STN (Super Twisted Nematic) mode, etc.

Light emitted from the W LED 230 enters the liquid crystal panel 40 through an edge thereof. The apparatus is constructed so that the light emitted from the W LED 230 and entering the liquid crystal panel 40 can illuminate the entire effective display area 206 by being repeatedly reflected between the prism sheet 204, the reflective polarizer 205, etc. Since the light can be introduced through an edge face of the sealing member 100, there is no need to mount a backlight behind the liquid crystal panel 40, and thus a thin liquid crystal display apparatus with an illuminating light source can be achieved.

The sealing member 100 includes spherical spacers for adjusting the gap between the two glass substrates 201 and 202, columnar fillers for scattering the light introduced from the W LED 230, and an adhesive material. The spacers and fillers can be formed from silica (with a refractive index of 1.35 to 1.45) or plastic (with a refractive index of 1.4 to 2.0). The liquid crystal 203 is thus held to a thickness of about 2 to 6 µm (in the case of TFT). In the case of PNLC, a liquid crystal thickness of 10 to 30 µm is preferable, while in the case of SFLC, a liquid crystal thickness of 1 to 2 µm is preferable.

The sealing member 100 is provided with an adjusting area 101 along the side that faces the W LED 230; the three sides other than the adjusting area side are formed with substantially the same thickness (for example, about 0.8 mm), and the adjusting area 101 is formed wider than the other sides (for example, the widest portion is about 3.2 mm wide). The adjusting area 101 of the sealing member 100 has a shape that gradually spreads like a quadratic curve starting from the portion closest to the W LED 230 and continuing to the effective display area 206. In other words, the adjusting area 101 of the sealing member 100 is formed in a semicylindrical shape, with its side facing the effective area 206 forming the base of the semicylinder and with its side facing the W LED 230 forming the apex.

Next, a fabrication method for the liquid crystal panel 40 shown in FIG. 2 will be briefly described below.

First, the sealing member 100 is formed by pattern printing on the inside surface of one of the two glass substrates 201 and 202 on which the plurality of signal electrodes, the plurality of scanning electrodes, TFT devices, pixel electrodes, etc., have been formed, and spacers are sprayed over the entire inside surface of the other one of the two glass substrates 201 and 202. Next, the two glass substrates are overlaid atop each other and bonded together. Next, the liquid crystal 203 is injected through the opening 102 of the sealing member 100 which is then sealed with the sealant 207. Next, the prism sheet 204 is placed on the outside surface of the glass substrate 201 of the liquid crystal panel 40, and the polarizer 206 is bonded on top of the prism sheet 204 by interposing an air layer between them. Next, the reflective polarizer 205 is bonded to the outside surface of the glass substrate 202.

The light emitted from the W LED 230 and entering the liquid crystal panel 40 is caused to spread sufficiently widely through the adjusting area 101 of the sealing member 100 functioning as a light diffusing means. Accordingly, in the liquid crystal panel 40, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

Figure 3:
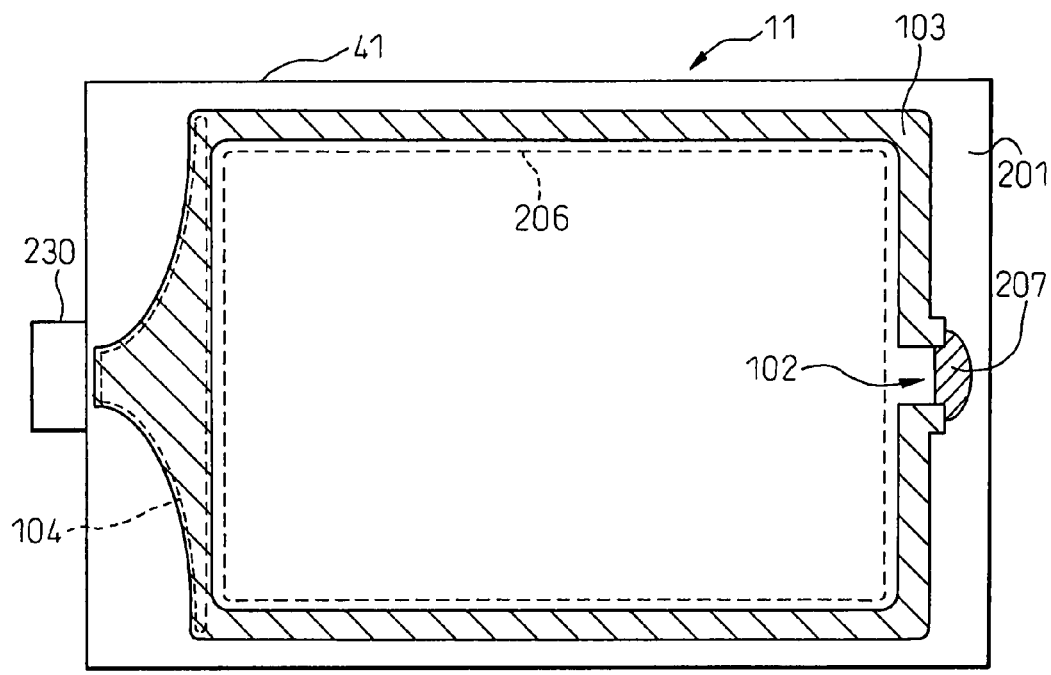
FIG. 3 is a diagram schematically showing the structure of another liquid crystal display apparatus 11 according to the present invention.

FIG. 3 is a diagram schematically showing the structure of another liquid crystal display apparatus 11 according to the present invention.

The difference between the liquid crystal display apparatus 11 shown in FIG. 3 and the liquid crystal display apparatus 10 shown in FIG. 2 lies in the shape of the adjusting area 104 formed along the W LED 230 side of the sealing member 103 in the liquid crystal panel 41. In this embodiment, the same components as those in FIG. 2 are designated by the same reference numerals.

The three sides of the sealing member 103 other than the W LED 230 side provided with the adjusting area 104 are formed with substantially the same thickness (for example, about 0.8 mm), and the adjusting area 104 facing the W LED 230 is formed wider than the other sides (for example, the widest portion is about 3.2 mm wide). In this embodiment, the adjusting area 104 of the sealing member 103 has a shape that gradually spreads like a hyperbola starting from the portion closest to the W LED 230 and continuing to the effective display area 206. In other words, the adjusting area 104 of the sealing member 103 is formed in a substantially trapezoidal shape sloping off at both ends (shaped like Mt. Fuji), with its side facing the W LED 230 forming the top side of the trapezoid and with its side facing the effective area 206 forming the bottom side.

The light emitted from the W LED 230 and entering the liquid crystal panel 41 is caused to spread sufficiently widely through the adjusting area 104 of the sealing member 103 functioning as a light diffusing means. Accordingly, in the liquid crystal panel 41, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

Figure 4:
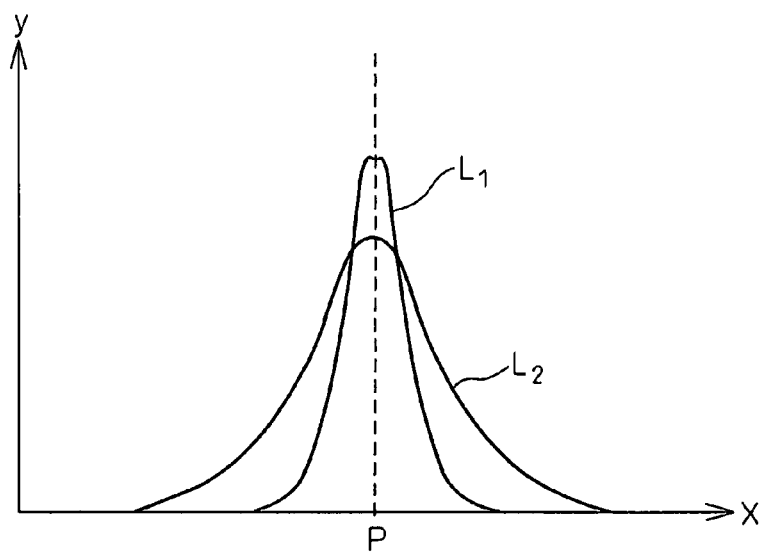
FIG. 4 is a diagram showing by way of example the light intensity distribution of an LED.

FIG. 4 is a diagram showing by way of example the light intensity distribution of the W LED.

In FIG. 4, the y-axis represents the light intensity, and the x-axis represents the angle from the light source. Here, point P indicates the point (0°) directly above the LED, and curve $L_1$ shows the light intensity distribution of the W LED when the LED is of the type having a narrow light intensity distribution, while curve $L_2$ shows the light intensity distribution of the W LED when the LED is of the type having a broad light intensity distribution.

When the W LED used has a light intensity distribution such as shown by the curve $L_1$, it is preferable that the adjusting area of the sealing member 100 formed along the side that faces the W LED 230 be formed in a substantially trapezoidal shape such as shown in FIG. 3. On the other hand, when the W LED used has a light intensity distribution such as shown by the curve $L_2$, it is preferable that the adjusting area of the sealing member 100 formed along the side that faces the W LED 230 be formed in a semicylindrical shape such as shown in FIG. 2(a). The reason is that, in the case of the light source having a narrow light intensity distribution such as shown by the curve $L_1$, since the light intensity drops as the angle from the center increases, it is preferable to use the substantially trapezoidal-shaped adjusting area whose thickness is substantially reduced as the angle from the center increases. On the other hand, in the case of the light source having a broad light intensity distribution such as shown by the curve $L_2$, since the light intensity is large even in regions where the angle from the center is large, it is preferable to use the semicylindrically-shaped adjusting area which retains a substantial thickness even in regions where the angle from the center is large. In this way, in the liquid crystal display apparatus according to the present invention, the shape of the sealing member can be optimally selected according to the emission characteristic of the LED in order to eliminate brightness nonuniformity.

Figure 5:
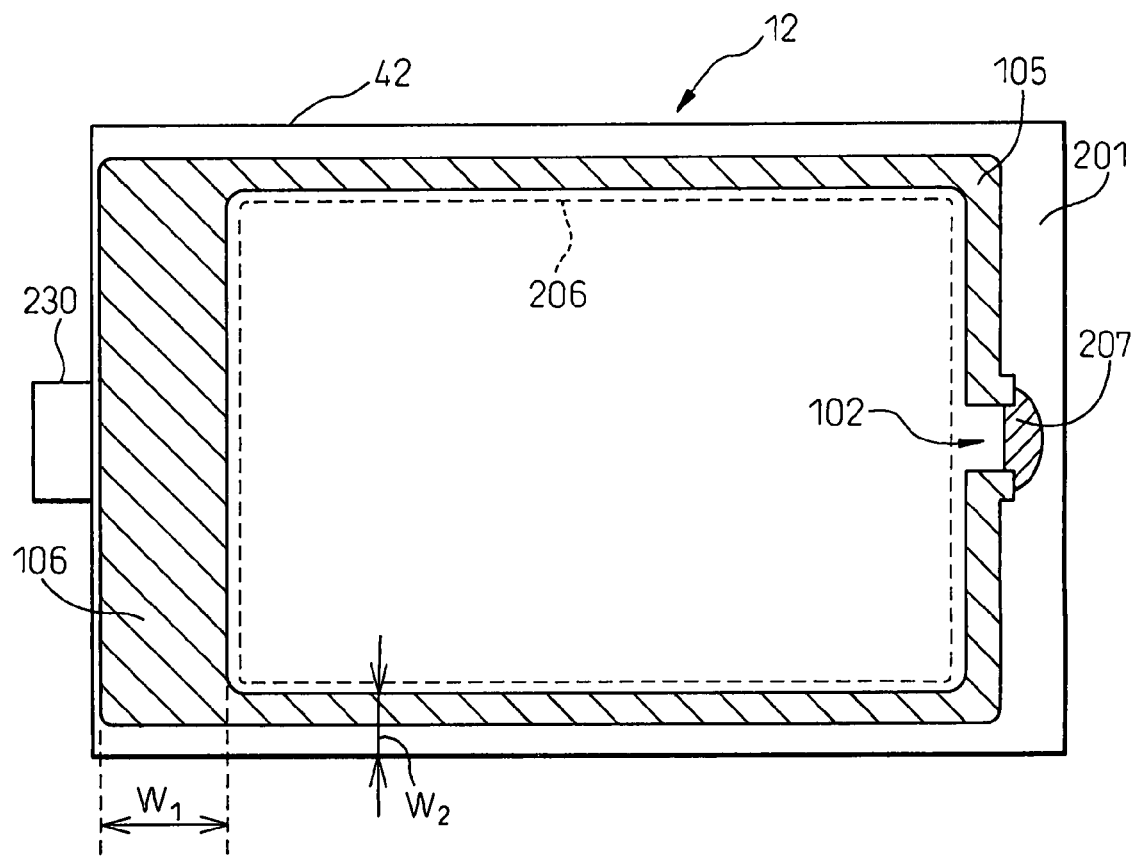
FIG. 5 is a diagram schematically showing the structure of another liquid crystal display apparatus 12 according to the present invention.

FIG. 5 is a diagram schematically showing the structure of another liquid crystal display apparatus 12 according to the present invention.

The difference between the liquid crystal display apparatus 12 shown in FIG. 5 and the liquid crystal display apparatus 10 shown in FIG. 2 lies in the shape of the adjusting area 106 formed along the W LED 230 side of the sealing member 105 in the liquid crystal panel 42. In this embodiment, the same components as those in FIG. 2 are designated by the same reference numerals.

The three sides of the sealing member 105 other than the W LED 230 side provided with the adjusting area 106 are formed with substantially the same thickness $W_2$ (for example, about 0.8 mm), and the adjusting area 106 facing the W LED 230 is formed with a thickness $W_1$ greater than the other sides (for example, the widest portion is about 3.2 mm wide).

The light emitted from the W LED 230 and entering the liquid crystal panel 42 is caused to spread sufficiently widely through the adjusting area 106 of the sealing member 105 functioning as a light diffusing means. Accordingly, in the liquid crystal panel 42, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment also, the light emitted from the W LED 230 can be efficiently utilized. The relationship between the $W_1$ and $W_2$ of the sealing member 105 will be described later.

Figure 6:
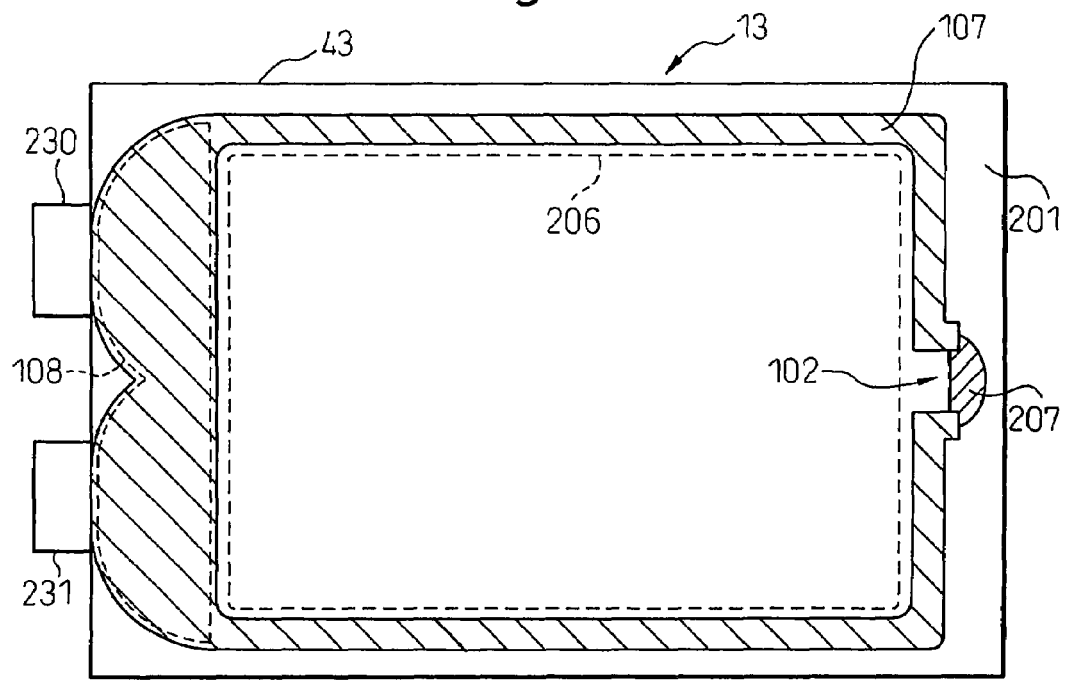
FIG. 6 is a diagram schematically showing the structure of another liquid crystal display apparatus 13 according to the present invention.

FIG. 6 is a diagram schematically showing the structure of another liquid crystal display apparatus 13 according to the present invention.

The liquid crystal display apparatus 13 shown in FIG. 6 differs from the liquid crystal display apparatus 10 shown in FIG. 2 in that two W LEDs 230 and 231 are used, and in that the shape of the adjusting area 108 formed along the W LED 230 side of the sealing member 107 in the liquid crystal panel 43 is modified. The W LED 231 is the same as the above-described W LED 230, and the reason that the two LEDs are used is to provide higher brightness throughout the effective display area 206. In this embodiment, the same components as those in FIG. 2 are designated by the same reference numerals.

The three sides of the sealing member 107 other than the side provided with the adjusting area 108 are formed with substantially the same thickness (for example, about 0.8 mm), and the adjusting area 108 is formed wider than the other sides (for example, the widest portion is about 3.2 mm wide). In this embodiment, the adjusting area 108 of the sealing member 107 has a shape that gradually spreads like two quadratic curves respectively starting from the portions closest to the respective W LEDs 230 and 231 and continuing to the effective display area 206. In other words, the adjusting area 108 of the sealing member 107 is formed in the shape of a double semicylinder, with its side facing the effective area 206 forming the base of the semicylinder and with its portions facing the respective W LEDs 230 and 231 forming the respective apexes.

The light emitted from the W LEDs 230 and 231 and entering the liquid crystal panel 43 is caused to spread sufficiently widely through the adjusting area 108 of the sealing member 107 functioning as a light diffusing means. Accordingly, in the liquid crystal panel 43, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LEDs 230 and 231 can be efficiently utilized.

Figure 7:
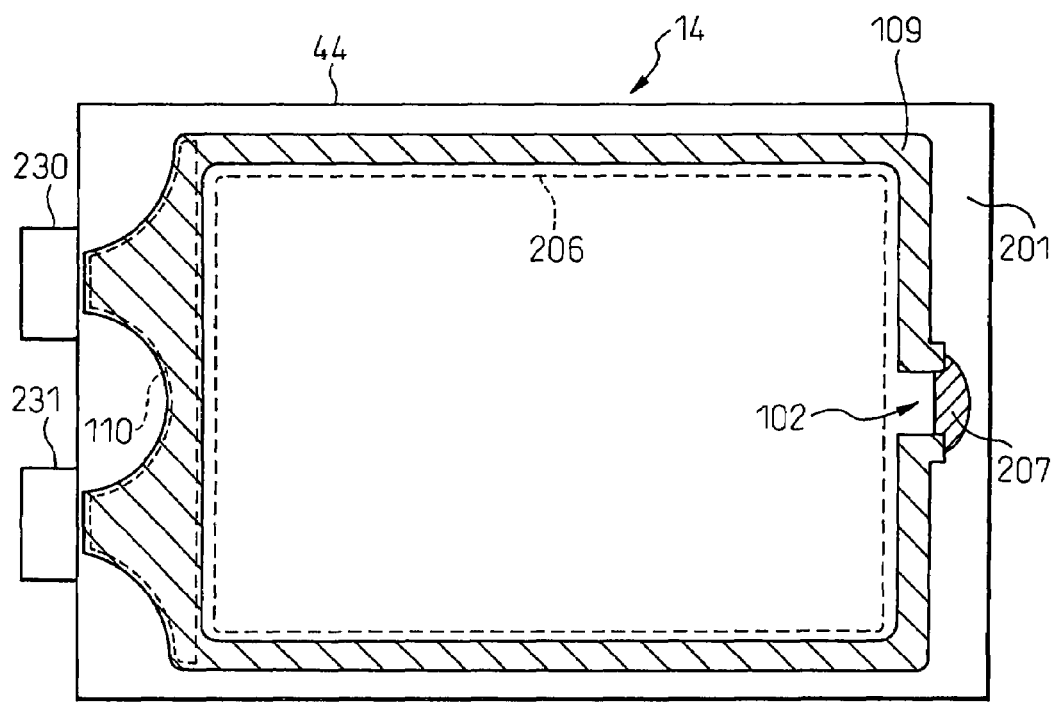
FIG. 7 is a diagram schematically showing the structure of another liquid crystal display apparatus 14 according to the present invention.

FIG. 7 is a diagram schematically showing the structure of another liquid crystal display apparatus 14 according to the present invention.

The liquid crystal display apparatus 14 shown in FIG. 7 differs from the liquid crystal display apparatus 10 shown in FIG. 2 in that two W LEDs 230 and 231 are used, and in that the shape of the adjusting area 110 formed along the W LED 230 side of the sealing member 109 in the liquid crystal panel 44 is modified. The W LED 231 is the same as the above-described W LED 230, and the reason that the two LEDs are used is to provide higher brightness throughout the effective display area 206. In this embodiment, the same components as those in FIG. 2 are designated by the same reference numerals.

The three sides of the sealing member 109 other than the side provided with the adjusting area 110 are formed with substantially the same thickness (for example, about 0.8 mm), and the adjusting area 110 is formed wider than the other sides (for example, the widest portion is about 3.2 mm wide). In this embodiment, the adjusting area 110 of the sealing member 109 has a shape that gradually spreads like two hyperbolas respectively starting from the portions closest to the respective W LEDs 230 and 231 and continuing to the effective display area 206. In other words, the adjusting area 110 of the sealing member 109 is formed in a substantially double trapezoidal shape sloping off at both ends (shaped like two Mr. Fujis side by side), with its portions closest to the W LEDs 230 and 231 respectively forming the top sides of the double trapezoid and with its side facing the effective area 206 forming the bottom side.

The light emitted from the W LEDs 230 and 231 and entering the liquid crystal panel 44 is caused to spread sufficiently widely through the adjusting area 110 of the sealing member 109 functioning as a light diffusing means. Accordingly, in the liquid crystal panel 44, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LEDs 230 and 231 can be efficiently utilized.

FIG. 8 is a diagram schematically showing the structure of another liquid crystal display apparatus 15 according to the present invention.

The liquid crystal display apparatus 15 shown in FIG. 8 differs from the liquid crystal display apparatus 10 shown in FIG. 2 in that two W LEDs 230 and 231 are used, and in that the shape of the sealing member 111 of the liquid crystal panel 45 is modified. The W LED 231 is the same as the above-described W LED 230, and the reason that the two LEDs are used, one on each of the right and left sides, is to provide higher brightness throughout the effective display area 206. In this embodiment, the same components as those in FIG. 2 are designated by the same reference numerals.

The two sides of the sealing member 111 other than the sides provided with the adjusting areas 112 and 113 are formed with substantially the same thickness (for example, about 0.8 mm), and the adjusting areas 112 and 113 are formed wider than the other sides (for example, the widest portion is about 3.2 mm wide). In this embodiment, each of the adjusting areas 112 and 113 of the sealing member 111 has a shape that gradually spreads like a quadratic curve starting from the portion closest to the W LED 230 or 231 and continuing to the effective display area 206. In other words, each of the adjusting areas 112 and 113 of the sealing member 111 is formed in a semicylindrical shape, with its side facing the effective area 206 forming the base of the semicylinder and with its side facing the W LED 230 or 231 forming the apex.

The light emitted from the W LEDs 230 and 231 and entering the liquid crystal panel 45 is caused to spread sufficiently widely through the adjusting areas 112 and 113 of the sealing member 111 functioning as light diffusing means. Accordingly, in the liquid crystal panel 45, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. Furthermore, since the light is incident from both the right and left sides of the effective display area 206, the brightness is not reduced even in portions farthest from the respective W LEDs. As a result, in this embodiment, the light emitted from the W LEDs 230 and 231 can be efficiently utilized.

FIG. 9 is a diagram schematically showing the structure of another liquid crystal display apparatus 16 according to the present invention.

The liquid crystal display apparatus 16 shown in FIG. 9 differs from the liquid crystal display apparatus 10 shown in FIG. 2 in that two W LEDs 230 and 231 are used, and in that the shape of the sealing member 114 of the liquid crystal panel 46 is modified. The W LED 231 is the same as the above-described W LED 230, and the reason that the two LEDs are used, one on each of the right and left sides, is to provide higher brightness throughout the effective display area 206. In this embodiment, the same components as those in FIG. 2 are designated by the same reference numerals.

The two sides of the sealing member 114 other than the sides provided with the adjusting areas 115 and 116 are formed with substantially the same thickness (for example, about 0.8 mm), and the adjusting areas 115 and 116 are formed wider than the other sides (for example, the widest portion is about 3.2 mm wide). In this embodiment, each of the adjusting areas 115 and 116 of the sealing member 114 has a shape that gradually spreads like a hyperbola starting from the portion closest to the W LED 230 or 231 and continuing to the effective display area 206. In other words, each of the adjusting areas 115 and 116 of the sealing member 114 is formed in a substantially trapezoidal shape sloping off at both ends (shaped like Mt. Fuji), with its side facing the W LED 230 or 231 forming the top side of the trapezoid and with its side facing the effective area 206 forming the bottom side.

The light emitted from the W LEDs 230 and 231 and entering the liquid crystal panel 46 is caused to spread sufficiently widely through the adjusting areas 115 and 116 of the sealing member 114 functioning as light diffusing means. Accordingly, in the liquid crystal panel 46, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. Furthermore, since the light is incident from both the right and left sides of the effective display area 206, the brightness does not drop even in portions farthest from the respective W LEDs. As a result, in this embodiment, the light emitted from the W LEDs 230 and 231 can be efficiently utilized.

FIG. 10 is a diagram schematically showing the structure of another liquid crystal display apparatus 17 according to the present invention.

The difference between the liquid crystal display apparatus 17 shown in FIG. 10 and the liquid crystal display apparatus 10 shown in FIG. 2 lies in the shape of the sealing member 117 of the liquid crystal panel 47. In this embodiment, the same components as those in FIG. 2 are designated by the same reference numerals.

The three sides of the sealing member 117 other than the side provided with the adjusting area 118 are formed with substantially the same thickness (for example, about 0.8 mm), and the adjusting area 118 is formed wider than the other sides (for example, the widest portion is about 3.2 mm wide). In this embodiment, the adjusting area 118 of the sealing member 117 has a substantially oval shape starting from the portion closest to the W LED 230 and continuing to the effective display area 206.

The light emitted from the W LED 230 and entering the liquid crystal panel 47 is caused to spread sufficiently widely through the adjusting area 118 of the sealing member 117 functioning as a light diffusing means. Accordingly, in the liquid crystal panel 47, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

FIG. 11 is a diagram schematically showing the structure of another liquid crystal display apparatus 18 according to the present invention.

The difference between the liquid crystal display apparatus 18 shown in FIG. 11 and the liquid crystal display apparatus 10 shown in FIG. 2 lies in the shape of the sealing member 119 of the liquid crystal panel 48. In this embodiment, the same components as those in FIG. 2 are designated by the same reference numerals.

That is, in the liquid crystal display apparatus 18 shown in FIG. 11, the adjusting area 120 of the sealing member 119 has a shape just reversed left and right from the adjusting area 101 shown in FIG. 2. In this case also, the light emitted from the W LED 230 and entering the liquid crystal panel 48 can be spread sufficiently widely through the adjusting area 120 of the sealing member 119 functioning as a light diffusing means. Though not shown here, the adjusting area 108 shown in FIG. 6 may be reversed left and right in a manner similar to that shown in FIG. 11. Further, though not shown here, the adjusting areas 112 and 113 shown in FIG. 8 may each be reversed left and right in a manner similar to that shown in FIG. 11.

Figure 12:
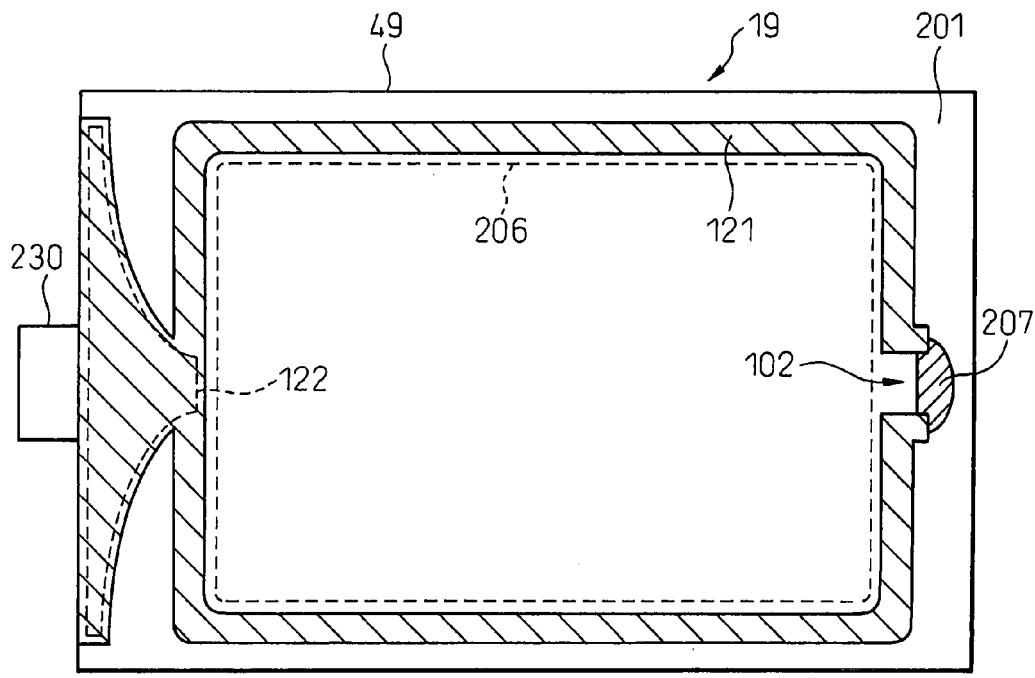
FIG. 12 is a diagram schematically showing the structure of another liquid crystal display apparatus 19 according to the present invention.

FIG. 12 is a diagram schematically showing the structure of another liquid crystal display apparatus 19 according to the present invention.

The difference between the liquid crystal display apparatus 19 shown in FIG. 12 and the liquid crystal display apparatus 10 shown in FIG. 2 lies in the shape of the sealing member 121 of the liquid crystal panel 49. In this embodiment, the same components as those in FIG. 2 are designated by the same reference numerals.

That is, in the liquid crystal display apparatus 19 shown in FIG. 12, the adjusting area 122 of the sealing member 121 has a shape just reversed left and right from the adjusting area 104 shown in FIG. 3. In this case also, the light emitted from the W LED 230 and entering the liquid crystal panel 49 can be spread sufficiently widely through the adjusting area 122 of the sealing member 121 functioning as a light diffusing means. Though not shown here, the adjusting area 110 shown in FIG. 7 may be reversed left and right in a manner similar to that shown in FIG. 12. Further, though not shown here, the adjusting areas 115 and 116 shown in FIG. 9 may each be reversed left and right in a manner similar to that shown in FIG. 12.

Figure 13:
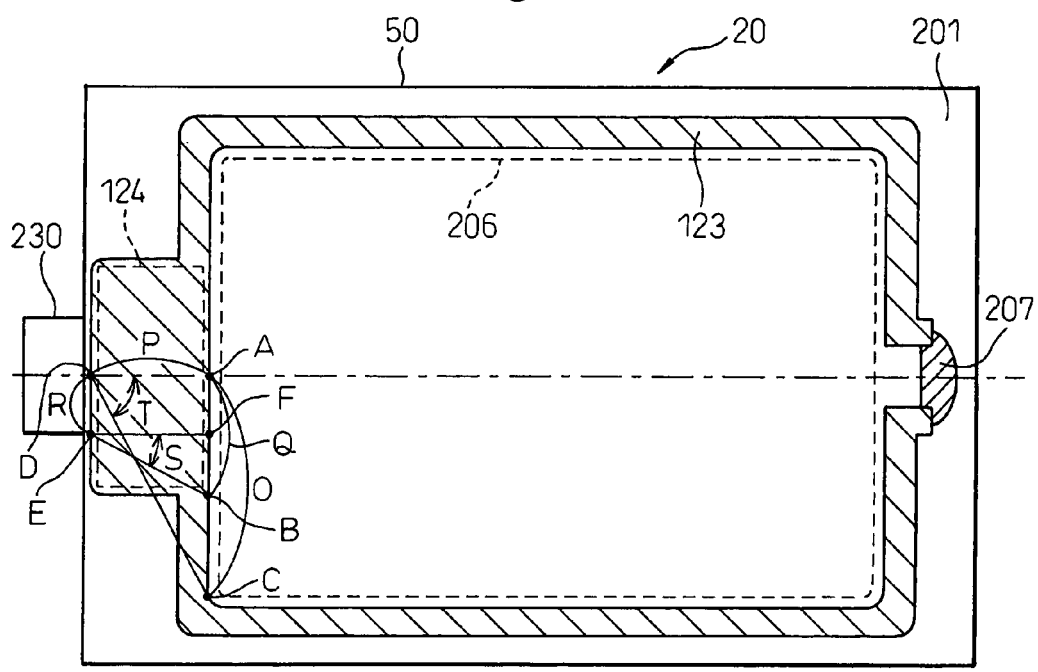
FIG. 13 is a diagram schematically showing the structure of another liquid crystal display apparatus 20 according to the present invention.

FIG. 13 is a diagram schematically showing the structure of another liquid crystal display apparatus 20 according to the present invention.

The difference between the liquid crystal display apparatus 20 shown in FIG. 13 and the liquid crystal display apparatus 10 shown in FIG. 2 lies in the shape of the sealing member 123 of the liquid crystal panel 50. In this embodiment, the same components as those in FIG. 2 are designated by the same reference numerals.

In FIG. 13, point A indicates the midpoint between the top and bottom of the effective display area 206, point B indicates an edge of the adjusting area 124, point C indicates the lower end of the effective display area 206, point D indicates the center of the W LED 230, and point F indicates the point at which a line perpendicular to the W LED 230 intersects the effective display area 206. Further, angle ADC is denoted as angle T, and angle FEB as angle S, while the haze value (%) of the effective display area 206 is designated by H. Further, the length of line segment AC is denoted as distance 0, the length of line segment AD as distance P, the length of line segment AB as distance Q, and the length of line segment DE as distance R.

Figure 14:
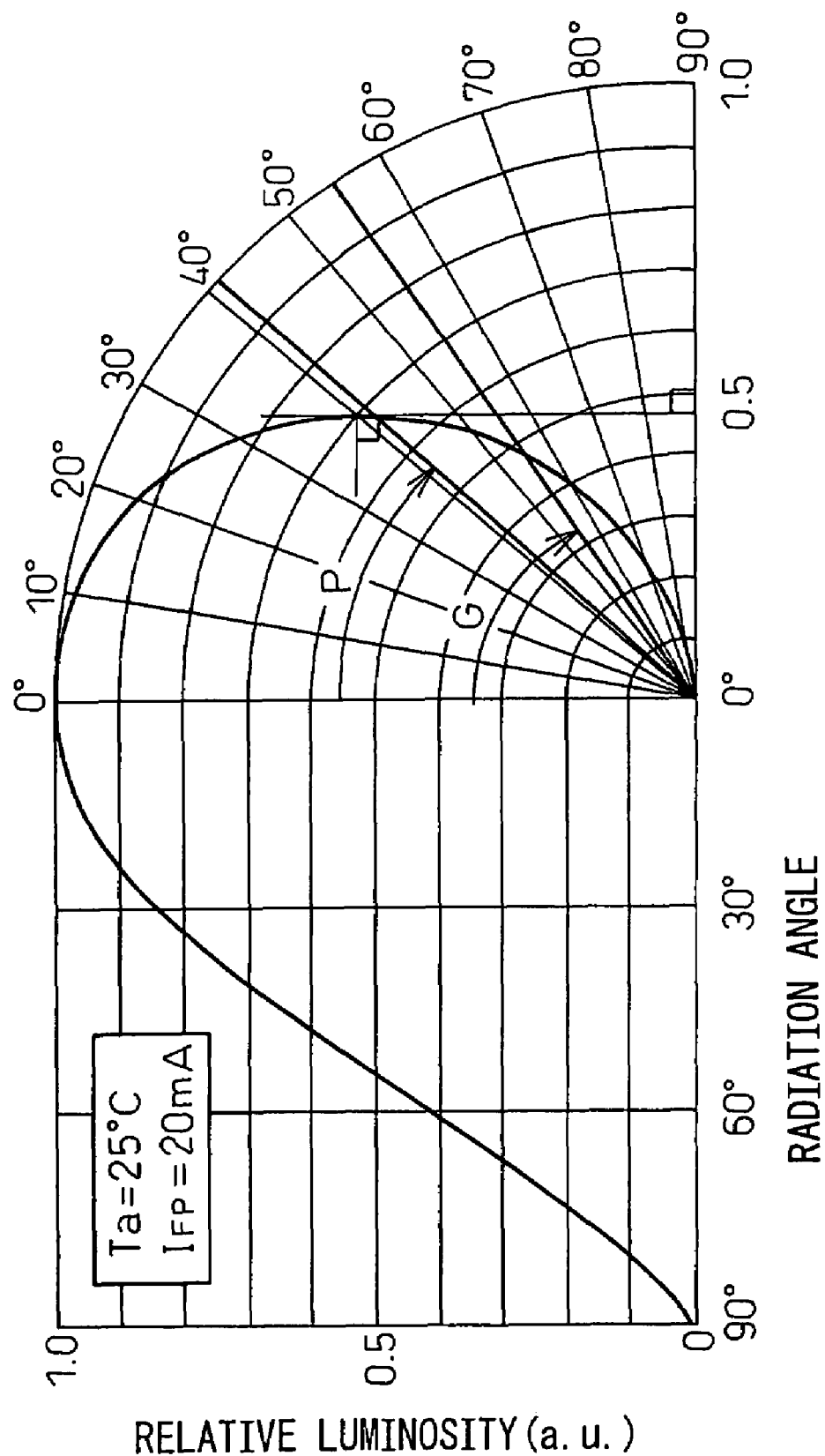
FIG. 14 is a diagram showing the relationship between relative luminosity and radiation angle.

FIG. 14 is a diagram showing one example of the directional characteristic of the W LED that can be used in the present embodiment.

FIG. 14 shows the relationship between the relative luminosity (a.u.) and the radiation angle of the W LED at an ambient temperature (Ta) of 25° C. and an applied current (IFP) of 20 mA. In FIG. 14, G indicates the angle at which the relative luminosity is 0.5, and P the angle at which the relative luminosity curve touches the normal to the axis taken at 90° in the graph.

Figure 15:
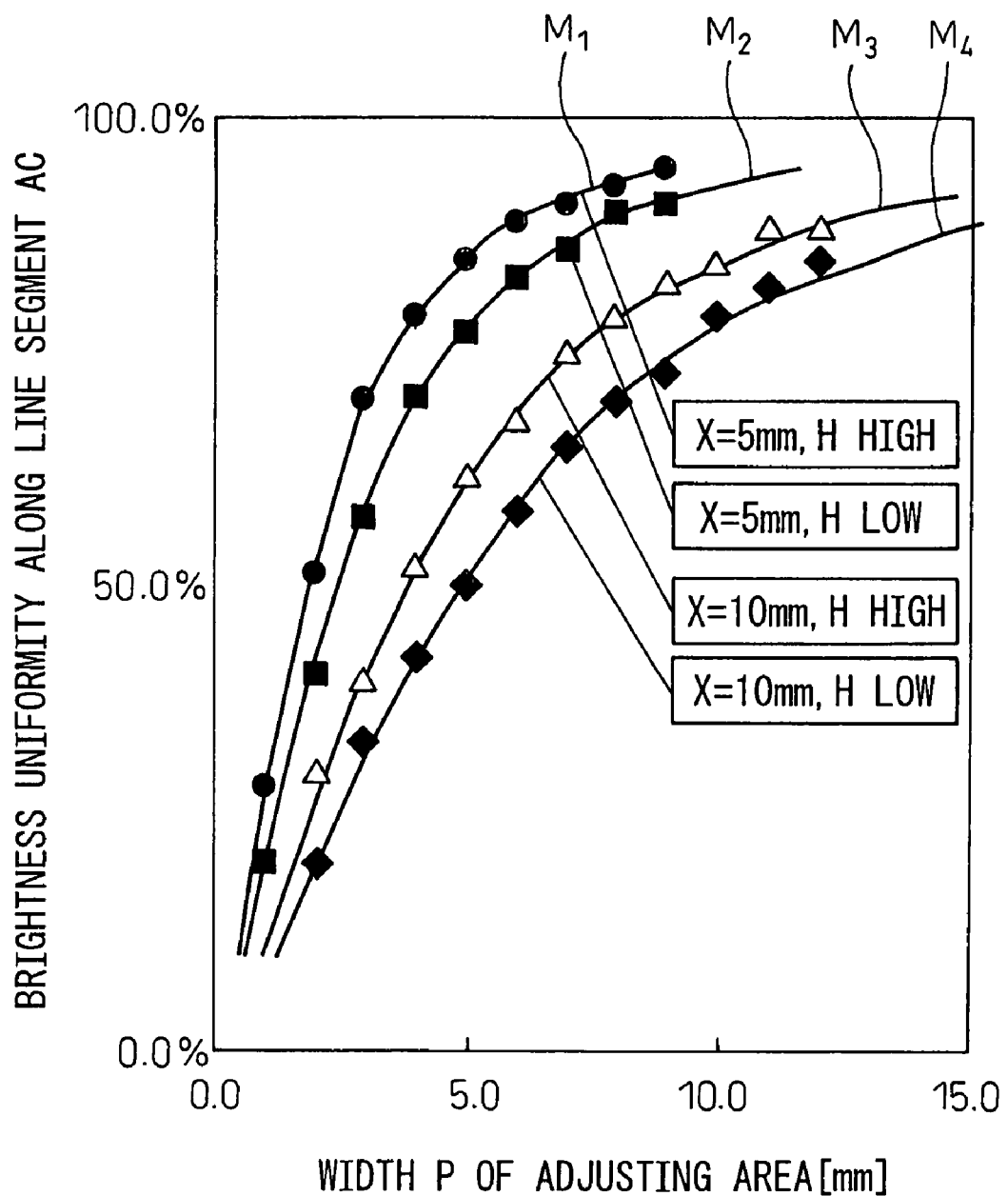
FIG. 15 is a diagram showing the relationship between adjusting area width and brightness uniformity.

FIG. 15 is a diagram showing the relationship between the width P of the adjusting area in FIG. 13 and the brightness uniformity along the line segment AC (edge portion of the effective display area).

In FIG. 15, curve $M_1$ shows the case where the distance O (length of the line segment AC) is 5 mm and the H (haze) of the adjusting area 124 is high, curve $M_2$ shows the case where the distance O (length of the line segment AC) is 5 mm and the H of the adjusting area 124 is low, curve $M_3$ shows the case where the distance O (length of the line segment AC) is 10 mm and the H of the adjusting area 124 is high, and curve $M_4$ shows the case where the distance O (length of the line segment AC) is 10 mm and the H of the adjusting area 124 is low.

Figure 16:
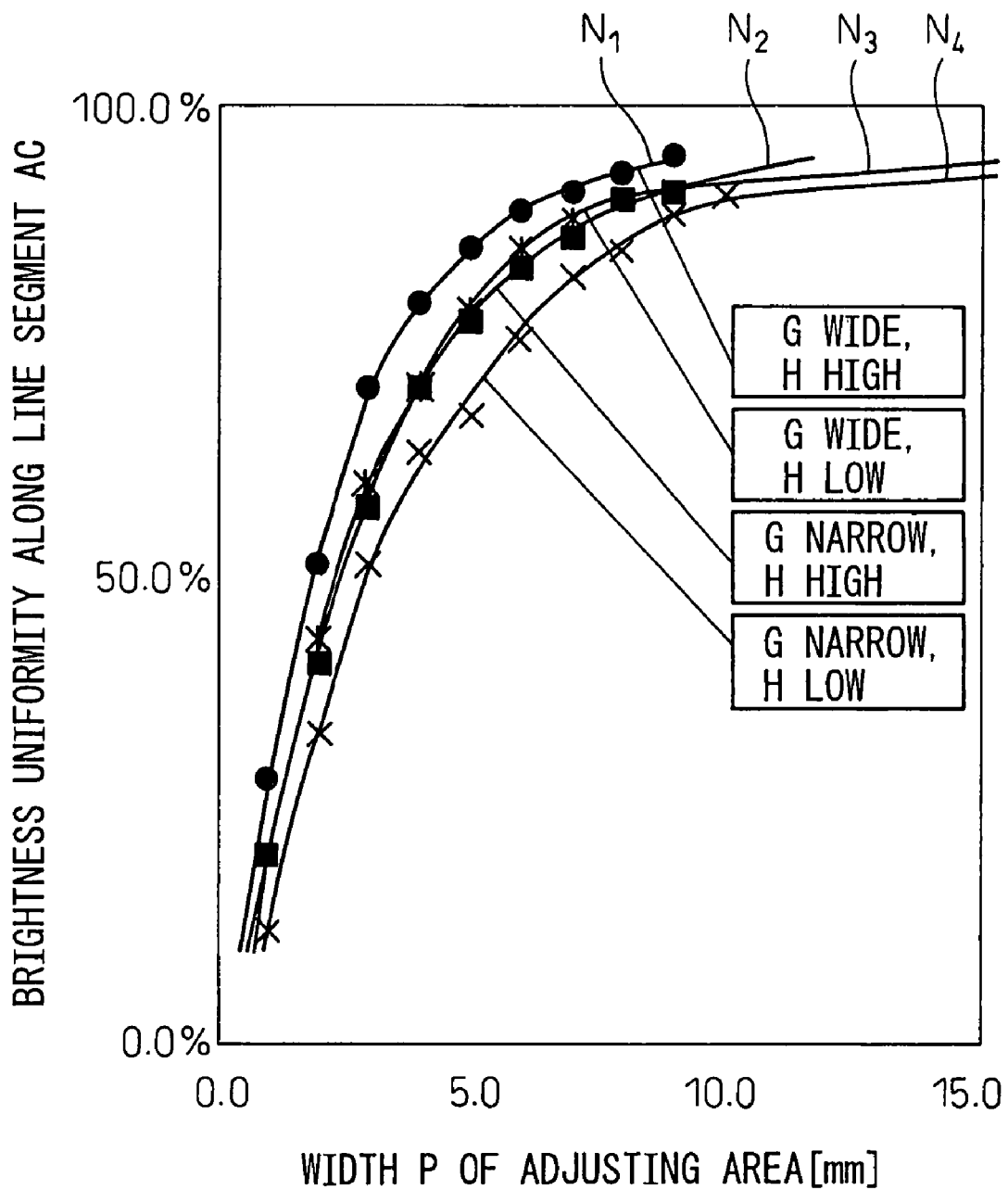
FIG. 16 is a diagram showing the relationship between adjusting area width and brightness uniformity.

FIG. 16 is a diagram showing the relationship between the width P of the adjusting area in FIG. 13 and the brightness uniformity along the line segment AC (edge portion of the effective display area).

In FIG. 16, curve $N_1$ shows the case where the G (the angle at which the relative luminosity is 0.5—see FIG. 14) is wide and the H of the adjusting area 124 is high, curve $N_2$ shows the case where the G is wide and the H of the adjusting area 124 is low, curve $N_3$ shows the case where the G is narrow and the H of the adjusting area 124 is high, and curve $N_4$ shows the case where the G is narrow and the H of the adjusting area 124 is low.

As can be seen from FIGS. 14 and 15, if the brightness uniformity of 70% is to be obtained along the line segment AC, it is desirable that the width of the adjusting area be larger than 3.0 mm in the case of the cell structure that satisfies the condition of the curve $M_1$ and be larger than 6.2 mm in the case of the cell structure that satisfies the condition of the curve $M_3$. Further as can be seen from FIGS. 14 and 16, if the brightness uniformity of 70% is to be obtained along the line segment AC, it is desirable that the width of the adjusting area be larger than 3.0 mm in the case of the cell structure that satisfies the condition of the curve $N_1$ and be larger than 4.0 mm in the case of the cell structure that satisfies the condition of the curve $N_3$.

Figure 17:
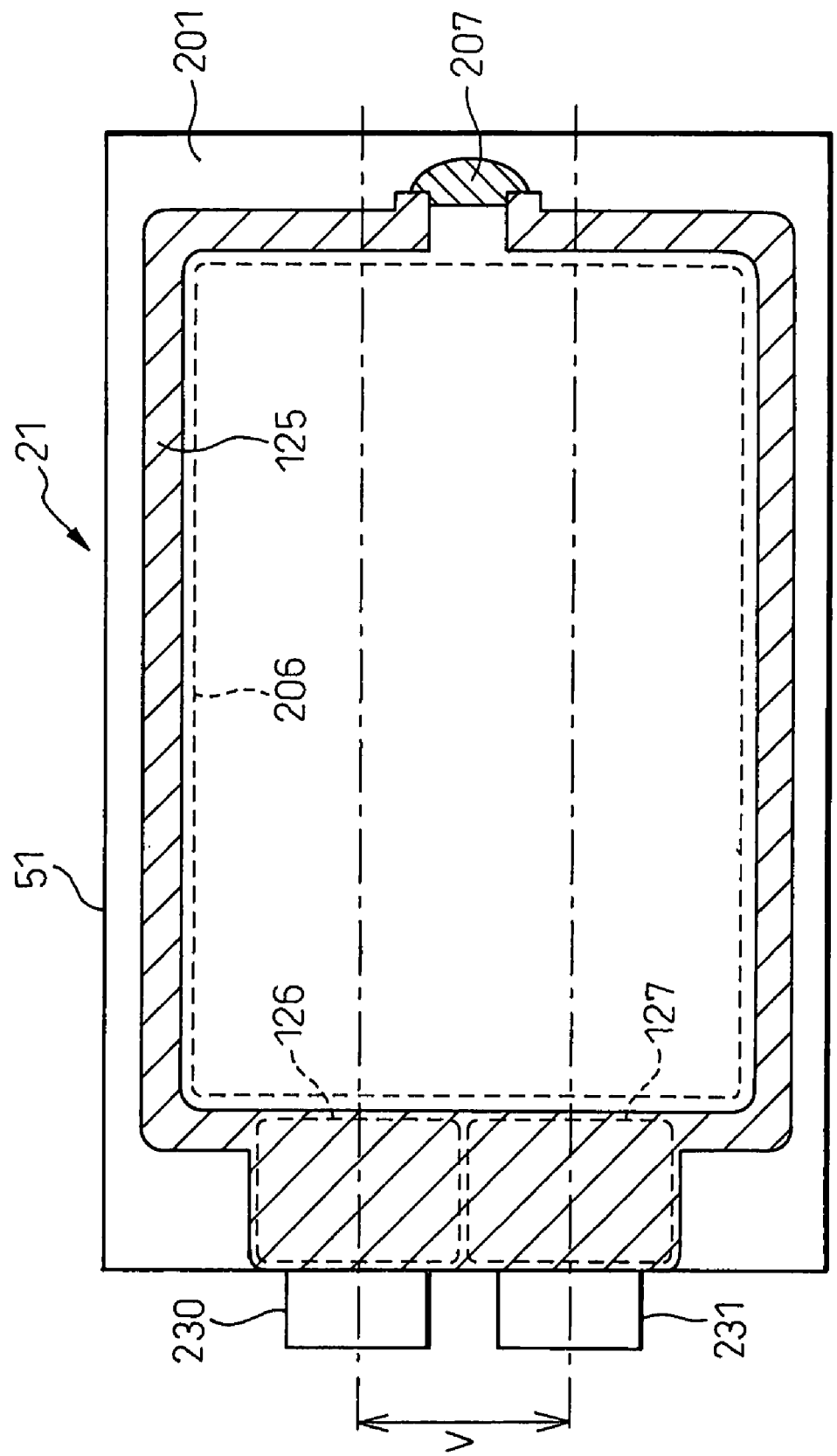
FIG. 17 is a diagram schematically showing the structure of another liquid crystal display apparatus 21 according to the present invention.

FIG. 17 is a diagram schematically showing the structure of another liquid crystal display apparatus 21 according to the present invention.

The liquid crystal display apparatus 21 shown in FIG. 17 differs from the liquid crystal display apparatus 20 shown in FIG. 13 in that two W LEDs 230 and 231 are used, and in that the sealing member 125 of the liquid crystal panel 51 is provided with two adjusting areas (adjusting areas 126 and 127) each similar to the one shown in FIG. 13. In this embodiment, the same components as those in FIG. 2 are designated by the same reference numerals.

The conditions of each adjusting area in FIG. 17 are the same as those shown in FIG. 13. When providing a plurality of adjusting areas, it is preferable to set their pitch not smaller than twice the distance Q.

The conditions of the adjusting area functioning as a light diffusing means have been described above with reference to FIGS. 13 to 17, but rather than providing the adjusting area only in the necessary portion of the sealing member as shown in FIGS. 13 to 17, the adjusting area may be formed, for example, across the entire width of the effective area as shown in FIG. 5. Here, $W_1$ is the thickness corresponding to the distance P shown in FIG. 13, which is obtained from the relationships such as shown in FIGS. 15 and 16 based on the correlations between the emission intensity of the LED, the haze value of the sealant, the size of the cell, and the required uniformity. On the other hand, $W_2$ is the minimum required thickness determined by the outer dimensions of the cell, and this thickness need not be made larger than $W_1$.

Figure 18:
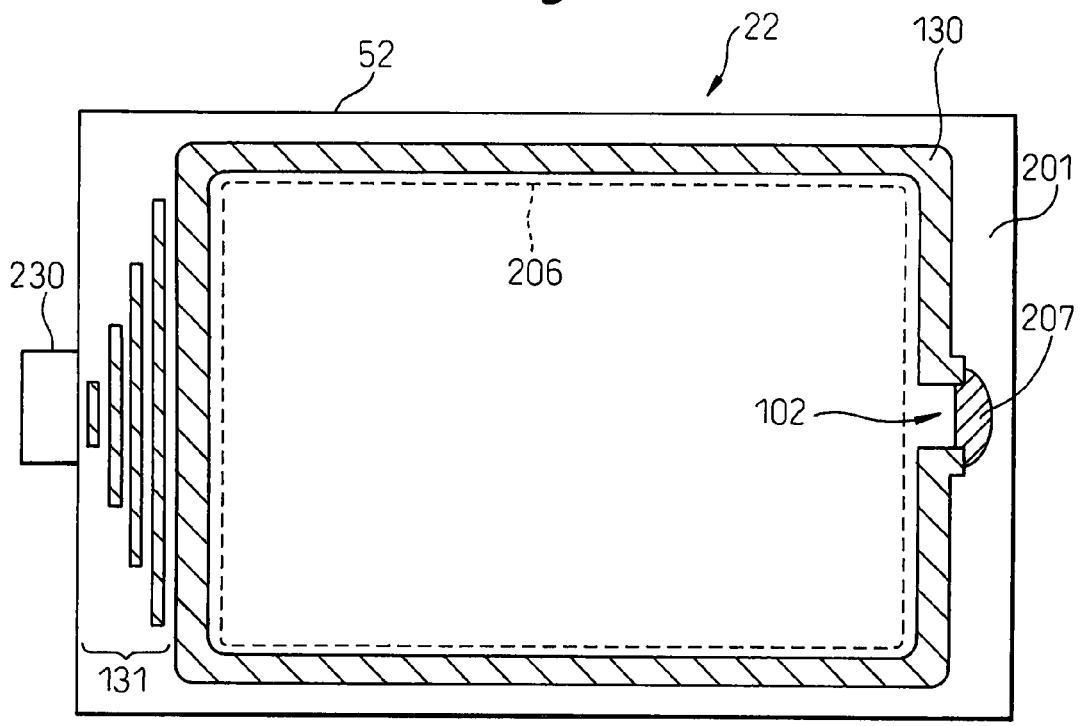
FIG. 18 is a diagram schematically showing the structure of another liquid crystal display apparatus 22 according to the present invention.

FIG. 18 is a diagram schematically showing the structure of another liquid crystal display apparatus 22 according to the present invention.

The liquid crystal display apparatus 22 shown in FIG. 18 differs from the liquid crystal display apparatus 10 shown in FIG. 2 in that the light incident from the W LED 230 is diffused by means of a seal pattern 131 provided between the W LED 230 and the sealing member 130. In this embodiment, the same components as those in FIG. 2 are designated by the same reference numerals.

The four sides of the sealing member 130 of the liquid crystal panel 52 are formed with substantially the same thickness (for example, about 0.8 mm). The seal pattern 131 is formed between the W LED 230 and the sealing member 130, or more specifically in a gap created between the two glass substrates 201 and 202. The seal pattern 131 comprises four bar-like patterns, the bar length being the shortest on the side closest to the W LED 230 and gradually increasing toward the effective display area 206. Further, the seal pattern 131 is formed simultaneously with the printing of the sealing member 130 by using exactly the same material as the sealing member 130. Accordingly, fillers and spacers similar to those contained in the sealing member 130 as previously described with reference to FIG. 2 are also contained in the seal pattern 131.

The light emitted from the W LED 230 and entering the seal pattern 131 is caused to spread sufficiently widely by the fillers contained in the seal pattern 131 functioning as a light diffusing means, and enters the effective display area 206 through the seal member 130. Accordingly, in the liquid crystal panel 52, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

Figure 19:
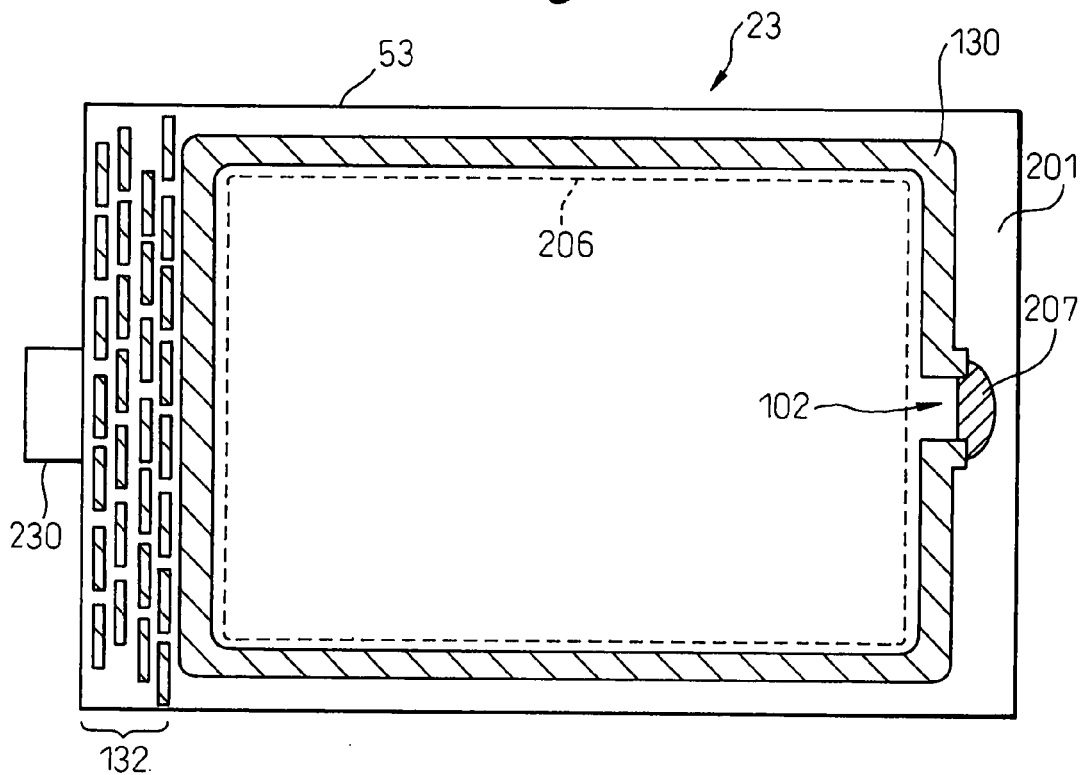
FIG. 19 is a diagram schematically showing the structure of another liquid crystal display apparatus 23 according to the present invention.

FIG. 19 is a diagram schematically showing the structure of another liquid crystal display apparatus 23 according to the present invention.

The liquid crystal display apparatus 23 shown in FIG. 19 differs from the liquid crystal display apparatus 10 shown in FIG. 2 in that the light incident from the W LED 230 is diffused by means of a seal pattern 132 provided between the W LED 230 and the sealing member 130. In this embodiment, the same components as those in FIG. 2 are designated by the same reference numerals.

The four sides of the sealing member 130 of the liquid crystal panel 53 are formed with substantially the same thickness (for example, about 0.8 mm). The seal pattern 132 is formed between the W LED 230 and the sealing member 130, or more specifically in a gap created between the two glass substrates 201 and 202. The seal pattern 132 is formed by randomly arranging thin bar-like patterns. Further, the seal pattern 132 is formed simultaneously with the printing of the sealing member 130 by using exactly the same material as the sealing member 130. Accordingly, fillers and spacers similar to those contained in the sealing member 130 as previously described with reference to FIG. 2 are also contained in the seal pattern 132.

The light emitted from the W LED 230 and entering the seal pattern 132 is caused to spread sufficiently widely by the fillers contained in the seal pattern 132 functioning as a light diffusing means, and enters the effective display area 206 through the seal member 130. Accordingly, in the liquid crystal panel 53, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

Figure 20:
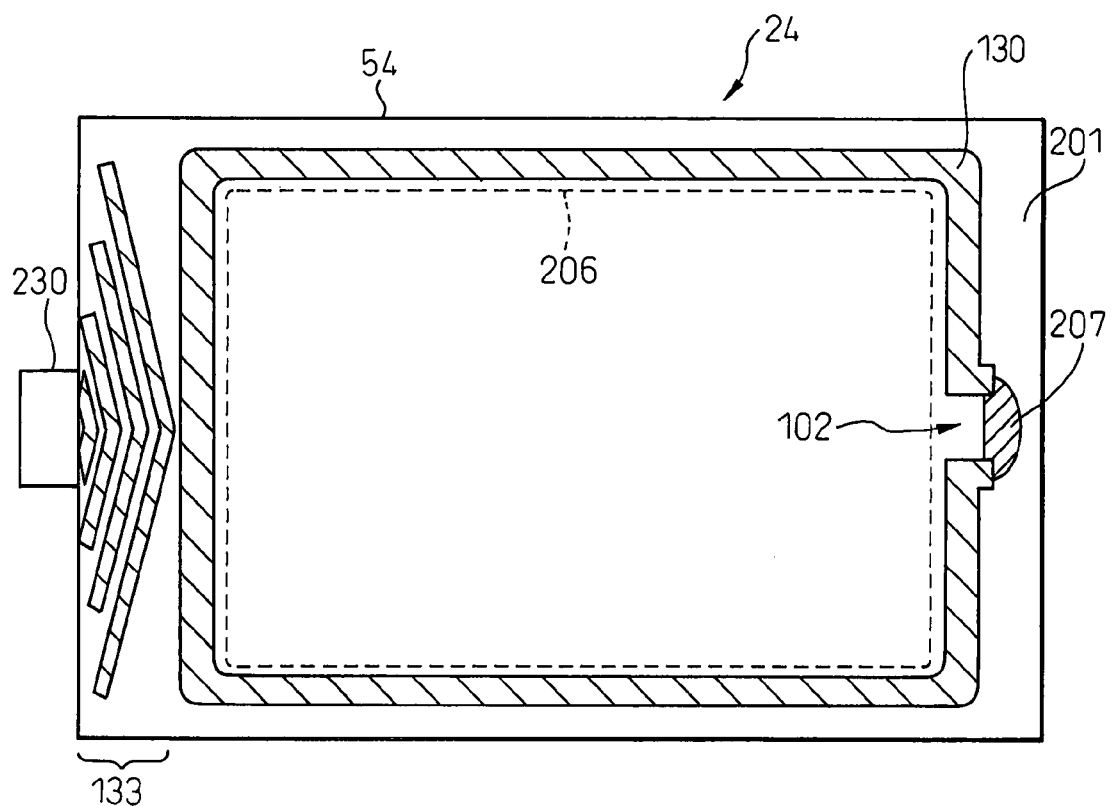
FIG. 20 is a diagram schematically showing the structure of another liquid crystal display apparatus 24 according to the present invention.

FIG. 20 is a diagram schematically showing the structure of another liquid crystal display apparatus 24 according to the present invention.

The liquid crystal display apparatus 24 shown in FIG. 20 differs from the liquid crystal display apparatus 10 shown in FIG. 2 in that the light incident from the W LED 230 is diffused by means of a seal pattern 133 provided between the W LED 230 and the sealing member 130. In this embodiment, the same components as those in FIG. 2 are designated by the same reference numerals.

The four sides of the sealing member 130 of the liquid crystal panel 54 are formed with substantially the same thickness (for example, about 0.8 mm). The seal pattern 133 is formed between the W LED 230 and the sealing member 130, or more specifically in a gap created between the two glass substrates 201 and 202. The seal pattern 133 comprises four bent bar-like patterns, the bar length being the shortest on the side closest to the W LED 230 and gradually increasing toward the effective display area 206. Further, the seal pattern 133 is formed simultaneously with the printing of the sealing member 130 by using exactly the same material as the sealing member 130. Accordingly, fillers and spacers similar to those contained in the sealing member 130 as previously described with reference to FIG. 2 are also contained in the seal pattern 133.

The light emitted from the W LED 230 and entering the seal pattern 133 is caused to spread sufficiently widely by the fillers contained in the seal pattern 133 functioning as a light diffusing means, and enters the effective display area 206 through the seal member 130. Accordingly, in the liquid crystal panel 54, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

Figure 21:
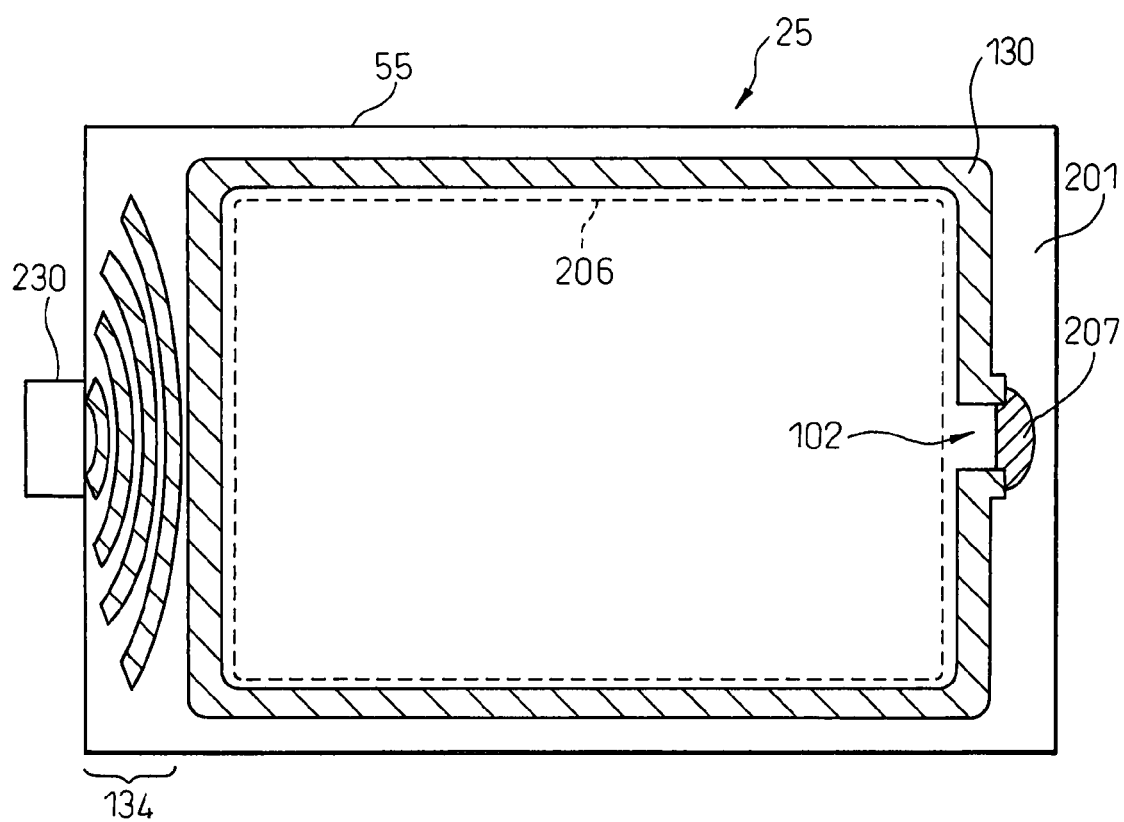
FIG. 21 is a diagram schematically showing the structure of another liquid crystal display apparatus 25 according to the present invention.

FIG. 21 is a diagram schematically showing the structure of another liquid crystal display apparatus 25 according to the present invention.

The liquid crystal display apparatus 25 shown in FIG. 21 differs from the liquid crystal display apparatus 10 shown in FIG. 2 in that the light incident from the W LED 230 is diffused by means of a seal pattern 134 provided between the W LED 230 and the sealing member 130. In this embodiment, the same components as those in FIG. 2 are designated by the same reference numerals.

The four sides of the sealing member 130 of the liquid crystal panel 55 are formed with substantially the same thickness (for example, about 0.8 mm). The seal pattern 134 is formed between the W LED 230 and the sealing member 130, or more specifically in a gap created between the two glass substrates 201 and 202. The seal pattern 134 comprises four arch-like patterns, the pattern length being the shortest on the side closest to the W LED 230 and gradually increasing toward the effective display area 206. Further, the seal pattern 134 is formed simultaneously with the printing of the sealing member 130 by using exactly the same material as the sealing member 130. Accordingly, fillers and spacers similar to those contained in the sealing member 130 as previously described with reference to FIG. 2 are also contained in the seal pattern 134.

The light emitted from the W LED 230 and entering the seal pattern 134 is caused to spread sufficiently widely by the fillers contained in the seal pattern 134 functioning as a light diffusing means, and enters the effective display area 206 through the seal member 130. Accordingly, in the liquid crystal panel 55, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

Figure 22:
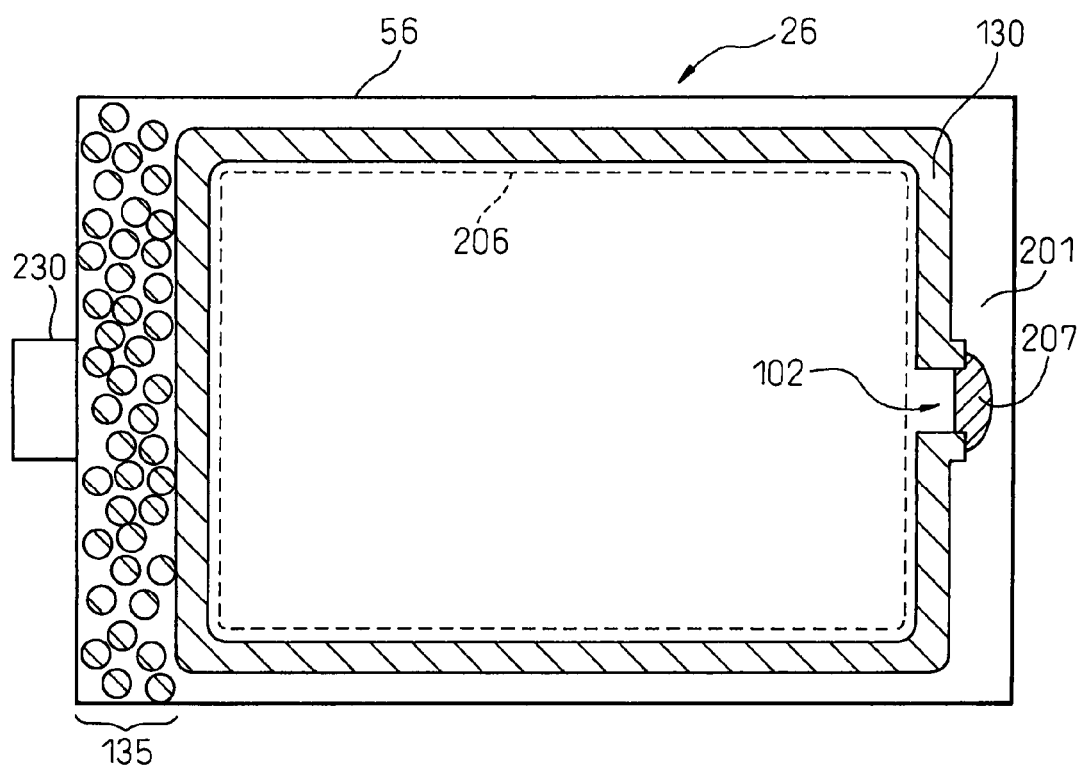
FIG. 22 is a diagram schematically showing the structure of another liquid crystal display apparatus 26 according to the present invention.

FIG. 22 is a diagram schematically showing the structure of another liquid crystal display apparatus 26 according to the present invention.

The liquid crystal display apparatus 26 shown in FIG. 22 differs from the liquid crystal display apparatus 10 shown in FIG. 2 in that the light incident from the W LED 230 is diffused by means of a seal pattern 135 provided between the W LED 230 and the sealing member 130. In this embodiment, the same components as those in FIG. 2 are designated by the same reference numerals.

The four sides of the sealing member 130 of the liquid crystal panel 56 are formed with substantially the same thickness (for example, about 0.8 mm). The seal pattern 135 is formed between the W LED 230 and the sealing member 130, or more specifically in the gap created between the two glass substrates 201 and 202. The seal pattern 135 is formed by randomly arranging a plurality of dot patterns. Further, the seal pattern 135 is formed simultaneously with the printing of the sealing member 130 by using exactly the same material as the sealing member 130. Accordingly, fillers and spacers similar to those contained in the sealing member 130 as previously described with reference to FIG. 2 are also contained in the seal pattern 135.

The light emitted from the W LED 230 and entering the seal pattern 135 is caused to spread sufficiently widely by the fillers contained in the seal pattern 135 functioning as a light diffusing means, and enters the effective display area 206 through the seal member 130. Accordingly, in the liquid crystal panel 56, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

The seal patterns 131 to 135 functioning as the light diffusing means have been described above with reference to FIGS. 18 to 22, but it will be recognized that the shapes of the seal patterns, the number of patterns, etc. are only examples, and are not limited to the illustrated ones. Accordingly, the optimum shape and optimum number of patterns can be selected according to the light intensity distribution of the W LED 230 used, the shape of the effective display area, the size, the number, the installation place, etc.

FIG. 23 is a diagram schematically showing the structure of still another liquid crystal display apparatus 27 according to the present invention.

FIG. 23(a) is a front view of the liquid crystal display apparatus 27, and FIG. 23(b) is a cross-sectional view taken along line Y-Y' in FIG. 23(a). As shown in FIG. 23, the liquid crystal display apparatus 27 comprises a liquid crystal panel 57 and a W (white) LED 230 as a point light source mounted on one side of the liquid crystal panel 57.

The liquid crystal panel 57 is constructed by bonding together a pair of glass substrates 201 and 202 with a sealing member 300 and by injecting a liquid crystal 403 through an opening 301 of the sealing member 300 so as to be sandwiched between the pair of glass substrates and sealing the opening with a sealant 207. A prism sheet 204 is placed on the viewer side (the upper side in FIG. 23(b)) of the liquid crystal panel 57, and a reflector 205 is mounted on the opposite side. The liquid crystal panel 57 is a TFT active-matrix liquid crystal display which can produce a 2.4-inch, QVGA-size (350×240 pixels) display within an effective display area 206. A plurality of signal electrodes and a plurality of scanning electrodes are respectively formed by patterning on the inside surfaces of the two glass substrates 201 and 202 of the liquid crystal panel 57; every point where a signal electrode and a scanning electrode intersect corresponds to a display pixel.

A polymer-dispersed liquid crystal with a haze value of 88% is used as the liquid crystal 403 here. When no voltage is applied to the polymer-dispersed liquid crystal, the liquid crystal molecules are randomly oriented. In this condition, when white light is incident, the incident light is scattered and the liquid crystal appears cloudy when viewed from the outside. On the other hand, when a voltage is applied to the polymer-dispersed liquid crystal, the liquid crystal molecules align parallel to the electric field, allowing the incident light to pass through, and the liquid crystal thus appears transparent when viewed from the outside.

Light emitted from the W LED 230 enters the liquid crystal panel 57 through an edge thereof. The apparatus is constructed so that the light emitted from the W LED 230 and entering the liquid crystal panel 57 can illuminate the entire effective display area 206 by being repeatedly reflected between the prism sheet 204, the reflector 205, etc. Since the light can be introduced through an edge face of the sealing member 300, there is no need to mount a backlight behind the liquid crystal panel 57, and thus a thin liquid crystal display apparatus with an illuminating light source can be achieved.

The sealing member 300 includes spacers for adjusting the gap between the two glass substrates 201 and 202, fillers for scattering the light introduced from the W LED 230, and an adhesive material. The spacers and fillers can be formed from silica (with a refractive index of 1.35 to 1.45) or plastic (with a refractive index of 1.4 to 2.0). The liquid crystal 403 is thus held to a prescribed thickness. In the case of PNLC, a thickness of 10 to 30 µm is preferable.

The four sides of the sealing member 300 are formed with substantially the same thickness (for example, about 0.8 mm). However, the side of the sealing member 300 that faces the W LED 230 is curved so as to conform with the outer shape of a light diffusing area 320 which gradually spreads like a quadratic curve starting from the portion closest to the W LED 230 and continuing to the effective display area 206. In other words, the light diffusing area 320 is formed in a semicylindrical shape, with its side facing the effective area 206 forming the base of the semicylinder and with its side facing the W LED 230 forming the apex.

Next, a fabrication method for the liquid crystal panel 57 shown in FIG. 23 will be briefly described below.

First, the sealing member 300 is formed by pattern printing on the inside surface of one of the two glass substrates 201 and 202 on which the plurality of signal electrodes, the plurality of scanning electrodes, TFT devices, pixel electrodes, etc., have been formed. Then, spacers are sprayed over the entire inside surface of the other one of the two glass substrates 201 and 202. Next, the two glass substrates are overlaid atop each other and bonded together. Next, the liquid crystal 403 is injected through the opening 301 of the sealing member 300 which is then sealed with the sealant 207. Next, by radiating UV light from the glass substrate 202 side, monomers in the polymer-dispersed liquid crystal material are cross-linked, thus forming a polymer network. Then, the prism sheet 204 is placed on the outside surface of the glass substrate 201 of the liquid crystal panel 57. After that, the reflector 205 is bonded to the outside surface of the glass substrate 202.

The light emitted from the W LED 230 and entering the liquid crystal panel 57 is caused to spread sufficiently widely through the light diffusing area 320 formed from a polymer-dispersed liquid crystal on the inside of the W LED side of the sealing member 300. Accordingly, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

As described, in this embodiment, the light diffusing area 320 formed from the polymer-dispersed liquid crystal to which no voltage is applied is provided in such a manner as to be continuous with the effective display area 206. Accordingly, in the liquid crystal panel 57, by allowing the light from the W LED 230 to enter the effective display area 206 after being sufficiently scattered through the light diffusing area 320, the brightness is prevented from becoming nonuniform across the effective display area 206. In this embodiment, the sealing member 300 has been formed by containing fillers therein so that the sealing member 300 also has a light diffusing function, but the sealing member 300 itself may be formed as a transparent member that does not have a light diffusing function.

Figure 24:
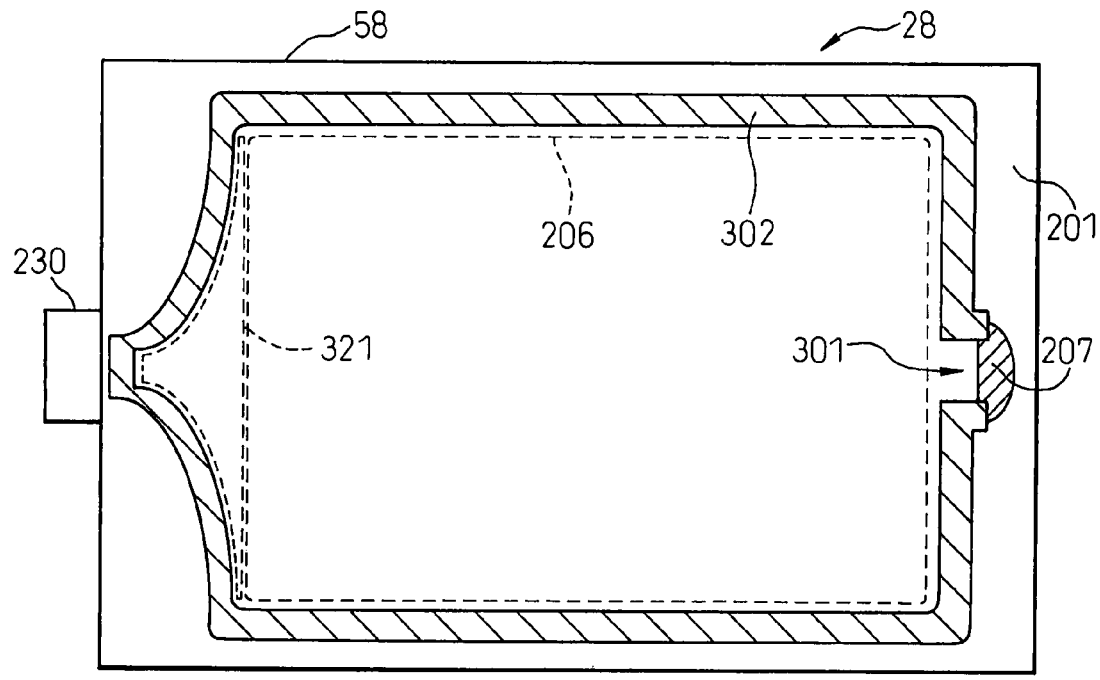
FIG. 24 is a diagram schematically showing the structure of another liquid crystal display apparatus 28 according to the present invention.

FIG. 24 is a diagram schematically showing the structure of another liquid crystal display apparatus 28 according to the present invention.

The difference between the liquid crystal display apparatus 28 shown in FIG. 24 and the liquid crystal display apparatus 27 shown in FIG. 23 lies in the shape of the light diffusing area 321 in the liquid crystal panel 58. In this embodiment, the same components as those in FIG. 23 are designated by the same reference numerals.

In this embodiment, the sealing member 302 is formed from the same material as that used in the liquid crystal display apparatus 27 shown in FIG. 23, and all the four sides have substantially the same thickness (for example, about 0.8 mm). However, the side of the sealing member 302 that faces the W LED 230 is curved so as to conform with the outer shape of the light diffusing area 321 which gradually spreads like a hyperbola starting from the portion closest to the W LED 230 and continuing to the effective display area 206. In other words, the light diffusing area 321 is formed in a substantially trapezoidal shape sloping off at both ends (shaped like Mt. Fuji), with its side facing the W LED 230 forming the top side of the trapezoid and with its side facing the effective area 206 forming the bottom side.

The light emitted from the W LED 230 and entering the liquid crystal panel 58 is caused to spread sufficiently widely through the light diffusing area 321 formed from a polymer-dispersed liquid crystal on the inside of the W LED side of the sealing member 302. Accordingly, in the liquid crystal panel 58, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

As described, in this embodiment, the light diffusing area 321 formed from the polymer-dispersed liquid crystal 403 to which no voltage is applied is provided in such a manner as to be continuous with the effective display area 206, and the light emitted from the W LED 230 is allowed to enter the effective display area 206 after being sufficiently scattered through the light diffusing area 321, thereby preventing the brightness from becoming nonuniform across the effective display area 206.

When the W LED used has a light intensity distribution such as shown by the curve $L_1$ (see FIG. 4), it is preferable that the light diffusing area formed on the inside of the W LED 230 side of the sealing member 300 be formed in a substantially trapezoidal shape such as shown in FIG. 24. On the other hand, when the W LED used has a light intensity distribution such as shown by the curve $L_2$ (see FIG. 4), it is preferable that the light diffusing area formed on the inside of the W LED 230 side of the sealing member 300 be formed in a semicylindrical shape such as shown in FIG. 23(*a*). The reason is that, in the case of the light source having a narrow light intensity distribution such as shown by the curve $L_1$, since the light intensity drops as the angle from the center increases, it is preferable to use the substantially trapezoidal-shaped light diffusing area whose thickness is substantially reduced as the angle from the center increases. On the other hand, in the case of the light source having a broad light intensity distribution such as shown by the curve $L_2$, since the light intensity is large even in regions where the angle from the center is large, it is preferable to use the semicylindrically-shaped light diffusing area which retains a substantial thickness even in regions where the angle from the center is large. In this way, in the liquid crystal display apparatus according to the present invention, the shape of the sealing member can be optimally selected according to the emission characteristic of the LED in order to eliminate brightness nonuniformity.

Figure 25:
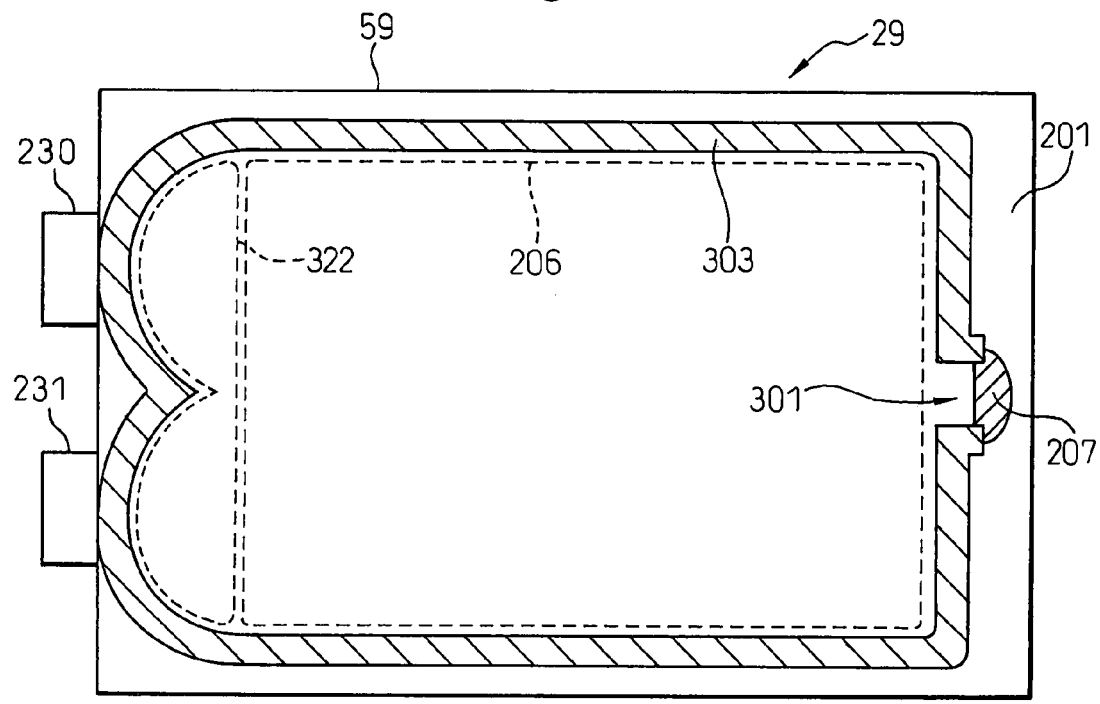
FIG. 25 is a diagram schematically showing the structure of another liquid crystal display apparatus 29 according to the present invention.

FIG. 25 is a diagram schematically showing the structure of another liquid crystal display apparatus 29 according to the present invention.

The liquid crystal display apparatus 29 shown in FIG. 25 differs from the liquid crystal display apparatus 27 shown in FIG. 23 in that two LEDs are used, and in that the shape of the light diffusing area 322 in the liquid crystal panel 59 is modified. The W LED 231 is the same as the above-described W LED 230, and the reason that the two LEDs are used is to provide higher brightness throughout the effective display area 206. In this embodiment, the same components as those in FIG. 23 are designated by the same reference numerals.

In this embodiment, the sealing member 303 is formed from the same material as that used in the liquid crystal display apparatus 27 shown in FIG. 23, and all the four sides have substantially the same thickness (for example, about 0.8 mm). However, the side of the sealing member 303 that faces the W LED 230 is curved so as to conform with the outer shape of the light diffusing area 322 which gradually spreads like two quadratic curves respectively starting from the portions closest to the respective W LEDs 230 and 231 and continuing to the effective display area 206. In other words, the light diffusing area 322 is formed in the shape of a double semicylinder, with its side facing the effective area 206 forming the base of the semicylinder and with its portions facing the respective W LEDs 230 and 231 forming the respective apexes.

The light emitted from the W LEDs 230 and 231 and entering the liquid crystal panel 59 is caused to spread sufficiently widely through the light diffusing area 322 formed from a polymer-dispersed liquid crystal on the inside of the W LED side of the sealing member 303. Accordingly, in the liquid crystal panel 59, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LEDs 230 and 231 can be efficiently utilized.

As described, in this embodiment, the light diffusing area 322 formed from the polymer-dispersed liquid crystal to which no voltage is applied is provided in such a manner as to be continuous with the effective display area 206, and the light emitted from the W LED 230 is allowed to enter the effective display area 206 after being sufficiently scattered through the light diffusing area 322, thereby preventing the brightness from becoming nonuniform across the effective display area 206.

Figure 26:
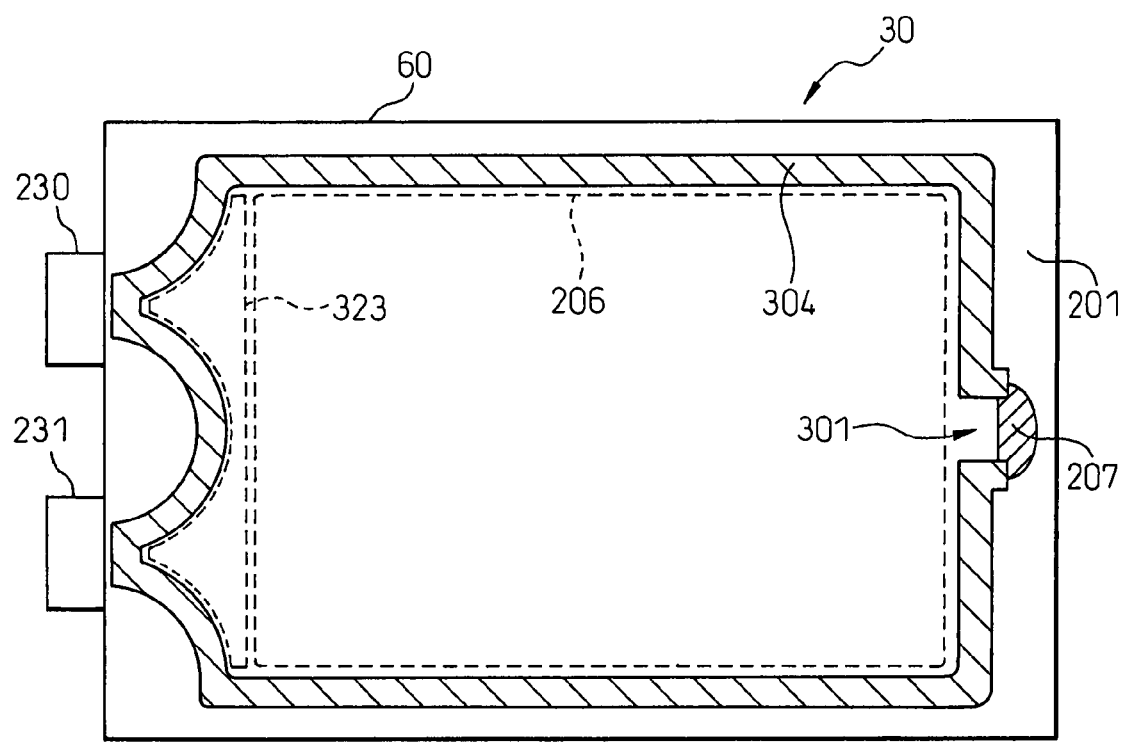
FIG. 26 is a diagram schematically showing the structure of another liquid crystal display apparatus 30 according to the present invention.

FIG. 26 is a diagram schematically showing the structure of another liquid crystal display apparatus 30 according to the present invention.

The liquid crystal display apparatus 30 shown in FIG. 26 differs from the liquid crystal display apparatus 27 shown in FIG. 23 in that two LEDs are used, and in that the shape of the light diffusing area 323 in the liquid crystal panel 60 is modified. The W LED 231 is the same as the above-described W LED 230, and the reason that the two LEDs are used is to provide higher brightness throughout the effective display area 206. In this embodiment, the same components as those in FIG. 23 are designated by the same reference numerals.

In this embodiment, the sealing member 304 is formed from the same material as that used in the liquid crystal display apparatus 27 shown in FIG. 23, and all the four sides have substantially the same thickness (for example, about 0.8 mm). However, the side of the sealing member 304 that faces the W LED 230 is curved so as to conform with the outer shape of the light diffusing area 323 which gradually spreads like two hyperbolas respectively starting from the portions closest to the respective W LEDs 230 and 231 and continuing to the effective display area 206. In other words, the light diffusing area 323 is formed in a substantially double trapezoidal shape sloping off at both ends (shaped like two Mt. Fujis), with its portions closest to the W LEDs 230 and 231 respectively forming the top sides of the double trapezoid and with its side facing the effective area 206 forming the bottom side.

The light emitted from the W LEDs 230 and 231 and entering the liquid crystal panel 60 is caused to spread sufficiently widely through the light diffusing area 323 formed from a polymer-dispersed liquid crystal on the inside of the W LED side of the sealing member 304. Accordingly, in the liquid crystal panel 60, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LEDs 230 and 231 can be efficiently utilized.

As described, in this embodiment, the light diffusing area 323 formed from the polymer-dispersed liquid crystal to which no voltage is applied is provided in such a manner as to be continuous with the effective display area 206, and the light emitted from the W LEDs 230 and 231 is allowed to enter the effective display area 206 after being sufficiently scattered through the light diffusing area 323, thereby preventing the brightness from becoming nonuniform across the effective display area 206.

Figure 27:
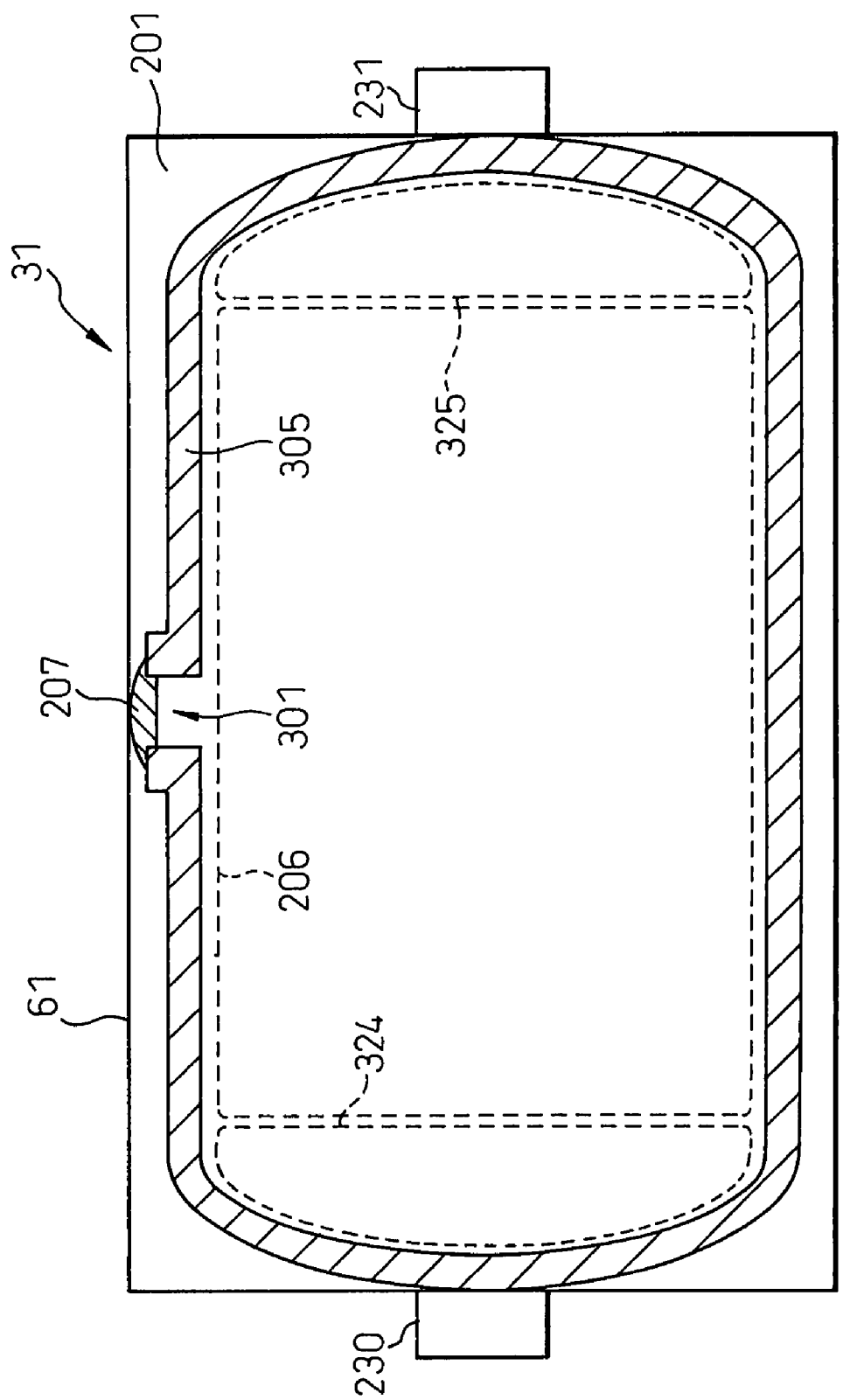
FIG. 27 is a diagram schematically showing the structure of another liquid crystal display apparatus 31 according to the present invention.

FIG. 27 is a diagram schematically showing the structure of another liquid crystal display apparatus 31 according to the present invention.

The liquid crystal display apparatus 31 shown in FIG. 27 differs from the liquid crystal display apparatus 27 shown in FIG. 23 in that two LEDs are used, and in that the liquid crystal panel 61 is provided with two light diffusing areas one on each of the right and left sides. The W LED 231 is the same as the above-described W LED 230, and the reason that the two LEDs are used, one on each of the right and left sides, is to provide higher brightness throughout the effective display area 206. In this embodiment, the same components as those in FIG. 23 are designated by the same reference numerals.

In this embodiment, the sealing member 305 is formed from the same material as that used in the liquid crystal display apparatus 27 shown in FIG. 23, and all the four sides have substantially the same thickness (for example, about 0.8 mm). However, the sides of the sealing member 305 that face the W LEDs 230 and 231, respectively, are curved so as to conform with the outer shapes of the respective light diffusing areas 324 and 325 each gradually spreading like a quadratic curve starting from the portion closest to the W LED 230 or 231 and continuing to the effective display area 206. In other words, each of the light diffusing areas 324 and 325 is formed in a semicylindrical shape, with its side facing the effective area 206 forming the base of the semicylinder and with its side facing the W LED 230 or 231 forming the apex.

The light emitted from the W LEDs 230 and 231 and entering the liquid crystal panel 61 is caused to spread sufficiently widely through the respective light diffusing areas 324 and 325 each formed from a polymer-dispersed liquid crystal provided on the inside of the W LED 230 or 231 side of the sealing member 305. Accordingly, in the liquid crystal panel 61, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. Furthermore, since the light is incident from both the right and left sides of the effective display area 206, the brightness does not drop even in portions farthest from the respective W LEDs. As a result, in this embodiment, the light emitted from the W LEDs 230 and 231 can be efficiently utilized.

As described, in this embodiment, the light diffusing areas 324 and 325, each formed from the polymer-dispersed liquid crystal to which no voltage is applied, are provided in such a manner as to be continuous with the effective display area 206, and the light emitted from the W LEDs 230 and 231 is allowed to enter the effective display area 206 after being sufficiently scattered through the respective light diffusing areas 324 and 325, thereby preventing the brightness from becoming nonuniform across the effective display area 206.

Figure 28:
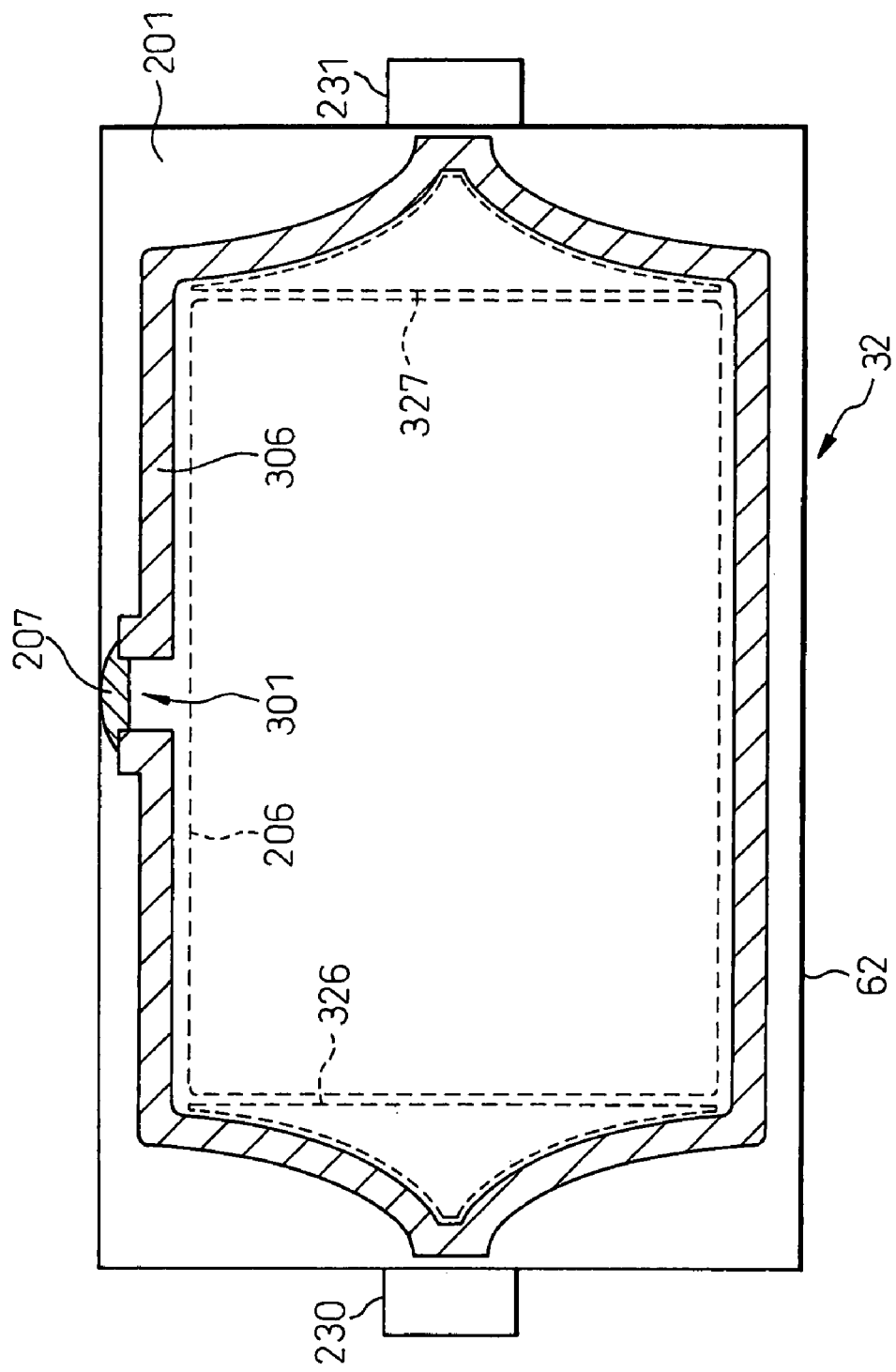
FIG. 28 is a diagram schematically showing the structure of another liquid crystal display apparatus 32 according to the present invention.

FIG. 28 is a diagram schematically showing the structure of another liquid crystal display apparatus 32 according to the present invention.

The liquid crystal display apparatus 32 shown in FIG. 28 differs from the liquid crystal display apparatus 27 shown in FIG. 23 in that two LEDs are used, and in that the liquid crystal panel 62 is provided with two light diffusing areas one on each of the right and left sides. The W LED 231 is the same as the above-described W LED 230, and the reason that the two LEDs are used, one on each of the right and left sides, is to provide higher brightness throughout the effective display area 206. In this embodiment, the same components as those in FIG. 23 are designated by the same reference numerals.

In this embodiment, the sealing member 306 is formed from the same material as that used in the liquid crystal display apparatus 27 shown in FIG. 23, and all the four sides have substantially the same thickness (for example, about 0.8 mm). However, the sides of the sealing member 306 that face the W LEDs 230 and 231, respectively, are curved so as to conform with the outer shapes of the respective light diffusing areas 326 and 327 each gradually spreading like a hyperbola starting from the portion closest to the W LED 230 or 231 and continuing to the effective display area 206. In other words, each of the light diffusing areas 326 and 327 is formed in a substantially trapezoidal shape sloping off at both ends (shaped like Mt. Fuji), with its side facing the W LED 230 or 231 forming the top side of the trapezoid and with its side facing the effective area 206 forming the bottom side.

The light emitted from the W LEDs 230 and 231 and entering the liquid crystal panel 62 is caused to spread sufficiently widely through the respective light diffusing areas 326 and 327 each formed from a polymer-dispersed liquid crystal provided on the inside of the W LED 230 or 231 side of the sealing member 306. Accordingly, in the liquid crystal panel 62, a brightness drop does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. Furthermore, since the light is incident from both the right and left sides of the effective display area 206, the brightness is not reduced even in portions farthest from the respective W LEDs. As a result, in this embodiment, the light emitted from the W LEDs 230 and 231 can be efficiently utilized.

As described, in this embodiment, the light diffusing areas 326 and 327, each formed from the polymer-dispersed liquid crystal to which no voltage is applied, are provided in such a manner as to be continuous with the effective display area 206, and the light emitted from the W LEDs 230 and 231 is allowed to enter the effective display area 206 after being sufficiently scattered through the respective light diffusing areas 326 and 327, thereby preventing the brightness from becoming nonuniform across the effective display area 206.

Figure 29:
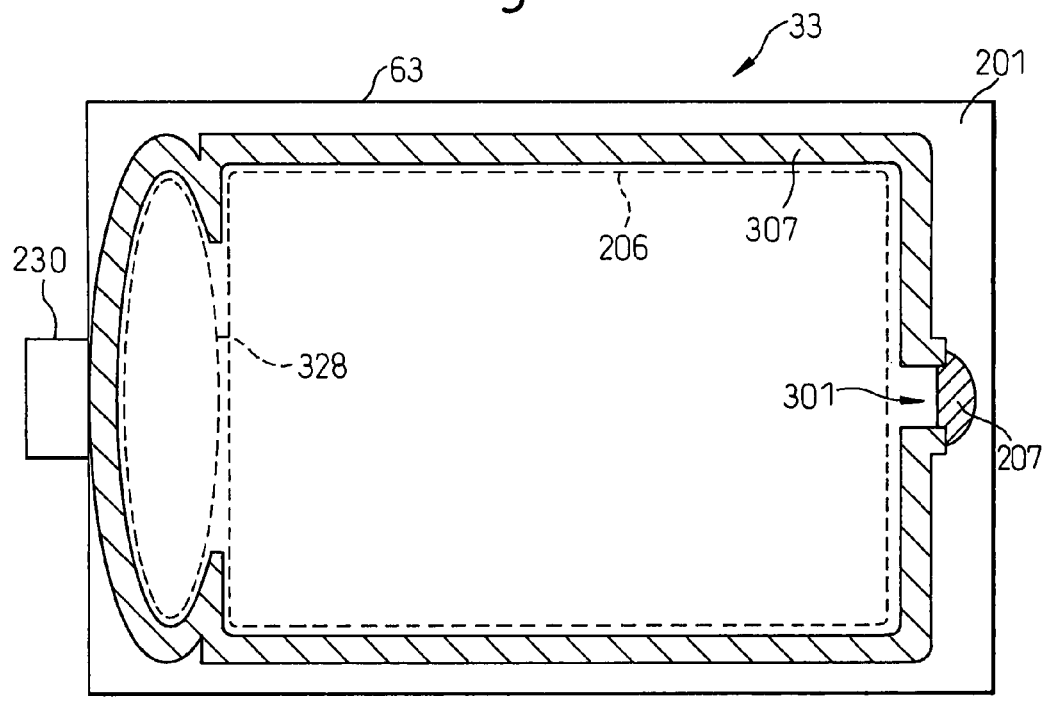
FIG. 29 is a diagram schematically showing the structure of another liquid crystal display apparatus 33 according to the present invention.

FIG. 29 is a diagram schematically showing the structure of another liquid crystal display apparatus 33 according to the present invention.

The difference between the liquid crystal display apparatus 33 shown in FIG. 29 and the liquid crystal display apparatus 27 shown in FIG. 23 lies in the shape of the light diffusing area 328 provided in the liquid crystal panel 63. In this embodiment, the same components as those in FIG. 23 are designated by the same reference numerals.

In this embodiment, the sealing member 307 is formed from the same material as that used in the liquid crystal display apparatus 27 shown in FIG. 23, and all the four sides have substantially the same thickness (for example, about 0.8 mm). However, the side of the sealing member 307 that faces the W LED 230 is formed in a substantially oval shape.

The light emitted from the W LED 230 and entering the liquid crystal panel 63 is caused to spread sufficiently widely through the light diffusing area 328 formed from a polymer-dispersed liquid crystal 403 provided on the inside of the W LED 230 side of the sealing member 307. Accordingly, in the liquid crystal panel 63, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

As described, in this embodiment, the light diffusing area 328 formed from the polymer-dispersed liquid crystal to which no voltage is applied is provided in such a manner as to be continuous with the effective display area 206, and the light emitted from the W LED 230 is allowed to enter the effective display area 206 after being sufficiently scattered through the light diffusing area 328, thereby preventing the brightness from becoming nonuniform across the effective display area 206.

Figure 30:
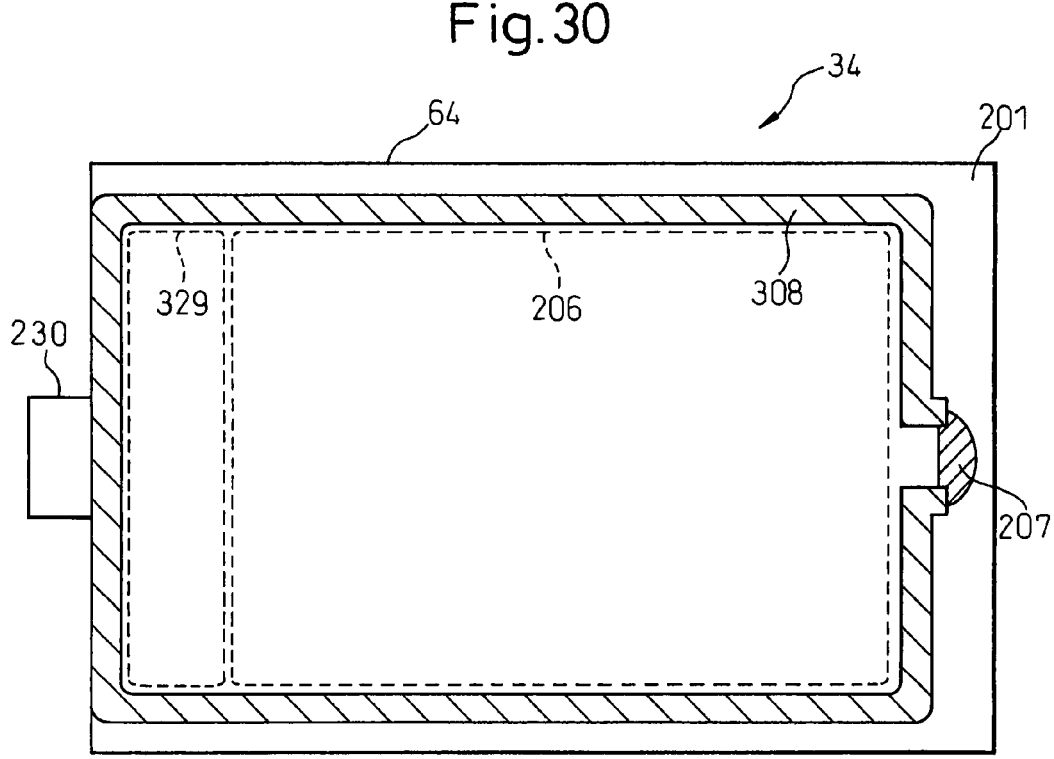
FIG. 30 is a diagram schematically showing the structure of another liquid crystal display apparatus 34 according to the present invention.

FIG. 30 is a diagram schematically showing the structure of another liquid crystal display apparatus 34 according to the present invention.

The difference between the liquid crystal display apparatus 34 shown in FIG. 30 and the liquid crystal display apparatus 27 shown in FIG. 23 lies in the shape of the light diffusing area 329 provided in the liquid crystal panel 64. In this embodiment, the same components as those in FIG. 23 are designated by the same reference numerals.

In this embodiment, the sealing member 308 is formed from the same material as that used in the liquid crystal display apparatus 27 shown in FIG. 23, and all the four sides have substantially the same thickness (for example, about 0.8 mm). However, the side of the sealing member 308 that faces the W LED 230 is formed in a substantially rectangular shape.

The light emitted from the W LED 230 and entering the liquid crystal panel 64 is caused to spread sufficiently widely through the light diffusing area 329 formed from a polymer-dispersed liquid crystal 403 on the inside of the W LED 230 side of the sealing member 308. Accordingly, in the liquid crystal panel 64, reduced brightness does not occur in the portions corresponding to the regions 6 and 8 in FIG. 1, nor does an excessive concentration of brightness occur in the portion corresponding to the region 7 in FIG. 1, that is, the brightness is uniform over the entire effective display area 206. As a result, in this embodiment, the light emitted from the W LED 230 can be efficiently utilized.

As described, in this embodiment, the light diffusing area 329 formed from the polymer-dispersed liquid crystal 403 to which no voltage is applied is provided in such a manner as to be continuous with the effective display area 206, and the light emitted from the W LED 230 is allowed to enter the effective display area 206 after being sufficiently scattered through the light diffusing area 329, thereby preventing the brightness from becoming nonuniform across the effective display area 206.

The light diffusing areas 320 to 329 have been described above with reference to FIGS. 23 to 30, but it will be recognized that the shapes of the light diffusing areas are only examples, and are not limited to the illustrated ones. Accordingly, the optimum shape can be selected according to the light intensity distribution of the W LED 230 and/or W LED 231 used, the shape of the effective display area 206, the size, the number, the installation place, etc.

What is claimed is:

1. A liquid crystal display apparatus comprising:
   a liquid crystal panel including a liquid crystal between a pair of substrates, said liquid crystal panel having an effective display area for displaying information;
   a sealing member placed around said liquid crystal to seal said liquid crystal between said pair of substrates; and
   a light source for illuminating said liquid crystal panel from an edge thereof;
   wherein said sealing member has one part that is formed wider than another part of said sealing member, said one part having a light diffusing function for causing light introduced from said light source to diffuse into said effective display area.

2. The liquid crystal display apparatus according to claim 1, wherein said one part of said sealing member has a shape that is determined based on a light emission characteristic of said light source.

3. The liquid crystal display apparatus according to claim 1, wherein said one part is formed in a rectangular shape, a semicylindrical shape whose side facing said light source forms an apex and whose side facing said effective display area forms a base side, a substantially trapezoidal shape whose side facing said light source forms a top side and whose side facing said effective display area forms a bottom side, a semicylindrical shape whose side facing said light source forms a base side and whose side facing said effective display area forms an apex, a substantially trapezoidal shape whose side facing said light source forms a bottom side and whose side facing said effective display area forms a top side, or a substantially oval shape.

4. The liquid crystal display apparatus according to claim 1, wherein said light source includes a plurality of LEDs,
   said one part s formed, for each of said LEDs, in a rectangular shape, a semicylindrical shape whose side facing said light source forms an apex and whose side facing said effective display area forms a base side, a substantially trapezoidal shape whose side facing said light source forms a top side and whose side facing said effective display area forms a bottom side, a semicylindrical shape whose side facing said light source forms a base side and whose side facing said effective display area forms an apex, a substantially trapezoidal shape whose side facing said light source forms a bottom side and whose side facing said effective display area forms a top side, or a substantially oval shape.

5. The liquid crystal display apparatus according to claim 4, wherein said plurality of LEDs are arranged at corresponding positions on one side of said effective display area.

6. The liquid crystal display apparatus according to claim 4, wherein said plurality of LEDs are arranged at respectively corresponding positions on a plurality of sides of said effective display area.

7. A liquid display apparatus comprising:
   a liquid crystal panel including a liquid crystal between a pair of substrates, said liquid crystal panel having an effective display area for displaying information;
   a sealing member placed around said liquid crystal to seal said liquid crystal between said pair of substrates;
   a light source for illuminating said liquid crystal panel from an edge thereof; and
   a seal pattern, provided between said pair of substrates and between said light source and said sealing member, for causing light introduced from said light source through said sealing member to diffuse into said effective display area,
   wherein said seal pattern has a width that gradually increases from one part closest to said light source toward another part closest to said sealing member for causing light introduced from said light source to diffuse into said effective display area.

8. The liquid crystal display apparatus according to claim 7, wherein said seal pattern is formed from the same material as said sealing member.

9. A liquid crystal display apparatus comprising:
   a liquid crystal panel including a liquid crystal between a pair of substrates, said liquid crystal panel having an effective display area for displaying information;
   a sealing member placed around said liquid crystal to seal said liquid crystal between said pair of substrates;
   a light source for illuminating said liquid crystal panel from an edge thereof; and
   light diffusing means, provided between said pair of substrates, for causing light introduced from said light source to diffuse into said effective display area;
   wherein said liquid crystal is a polymer-dispersed liquid crystal,
   said sealing member seals said liquid crystal so that said effective display area and a light diffusing area continuous with said effective display area can be formed,
   said light diffusing means is formed from said polymer-dispersed liquid crystal sealed with said light diffusing area, and
   said light diffusing area has a width that gradually increases from one part closest to said light source toward another part closest to said effective display area for causing light introduced from said light source to diffuse into said effective display area.

10. The liquid crystal display apparatus according to claim 9, wherein said light diffusing area has a shape that is determined based on a light emission characteristic of said light source.

11. The liquid crystal display apparatus according to claim 9, wherein said light diffusing area is formed in a semicylindrical shape whose side facing said light source forms an apex and whose side facing said effective display area forms a base side, or a substantially trapezoidal shape whose side facing said light source forms a top side and whose said facing said effective display area forms a bottom side.

12. The liquid crystal display apparatus according to claim 9, wherein said light source includes a plurality of LEDs, and said light diffusing area is formed, for each of said LEDs, in a semicylindrical shape whose side facing said light source forms an apex and show side facing said effective display area forms a base side, or a substantially trapezoidal shape whose side facing said light source forms a top side and whose side facing said effective display area forms a bottom side.

13. The liquid crystal display apparatus according to claim 12, wherein said plurality of LEDs are arranged at corresponding positions on one side of said effective display area.

14. The liquid crystal display apparatus according to claim 12, wherein said plurality of LEDs are arranged at respectively corresponding positions on a plurality of sides of said effective display area.

* * * * *